US011148328B2

(12) United States Patent
Condon et al.

(10) Patent No.: US 11,148,328 B2
(45) Date of Patent: Oct. 19, 2021

(54) METHOD AND APPARATUS TO PRODUCE AUXETIC FOAM

(71) Applicant: AUXADYNE, LLC, Keystone Heights, FL (US)

(72) Inventors: Joe Condon, Keystone Heights, FL (US); Betsy Condon, Keystone Heights, FL (US); Scott Andrews, Keystone Heights, FL (US); Melissa Andrews, Keystone Heights, FL (US); Justin Raysin, Keystone Heights, FL (US)

(73) Assignee: Auxadyne, LLC, Keystone Heights, FL (US)

( * ) Notice: Subject to any disclaimer, the term of this patent is extended or adjusted under 35 U.S.C. 154(b) by 533 days.

(21) Appl. No.: 15/982,522

(22) Filed: May 17, 2018

(65) Prior Publication Data

US 2018/0333903 A1 Nov. 22, 2018

Related U.S. Application Data

(60) Provisional application No. 62/508,186, filed on May 18, 2017.

(51) Int. Cl.
*B29C 43/34* (2006.01)
*B29C 44/34* (2006.01)
(Continued)

(52) U.S. Cl.
CPC ............ *B29C 43/34* (2013.01); *B29C 44/357* (2013.01); *B29C 2043/3227* (2013.01);
(Continued)

(58) Field of Classification Search
CPC .................................................... B29C 43/34
See application file for complete search history.

(56) References Cited

U.S. PATENT DOCUMENTS

| 3,743,469 A | 7/1973 | Gibbons |
| 3,811,242 A | 5/1974 | Hayford, Jr. |

(Continued)

FOREIGN PATENT DOCUMENTS

| DE | 10 2011 083688 | 4/2013 |
| GB | 2489457 | 10/2012 |
| WO | WO9925530 A1 | 5/1999 |

OTHER PUBLICATIONS

PCTUS201833206—ISR and Written Opinion dated Aug. 23, 2018.
EP 18802876.5—Extended European Search Report dated Jan. 21, 2021.

*Primary Examiner* — Larry W Thrower
(74) *Attorney, Agent, or Firm* — Aldo Noto; Davidson Berquist Jackson & Gowdey LLP

(57) ABSTRACT

In methods and apparatuses for producing auxetic foam from conventional foam, conventional foam is compressed into a mold before thermal, chemical or thermo-chemical treatment processes are performed. A segmented mold is accommodated in a compressing apparatus. After compressing the foam between the mold segments, the mold is fastened shut and removed from the compressing apparatus. The forces applied to any given volume of foam and the amounts by which the foam is compressed while being processed are controlled to impart desired mechanical properties to the produced foam. Poisson's ratio and density of discrete portions of finished foam shapes are reliably predicted and controlled to achieve uniform and non-uniform mechanical properties within a single continuous quantity of foam.

13 Claims, 26 Drawing Sheets

(51) Int. Cl.
  *B29C 43/32* (2006.01)
  *B29C 43/58* (2006.01)
  *B29K 105/04* (2006.01)

(52) U.S. Cl.
  CPC ............. *B29C 2043/3427* (2013.01); *B29C 2043/3477* (2013.01); *B29C 2043/5808* (2013.01); *B29C 2043/5825* (2013.01); *B29C 2043/5866* (2013.01); *B29K 2105/04* (2013.01); *B29K 2995/0094* (2013.01)

(56) References Cited

U.S. PATENT DOCUMENTS

| | | |
|---|---|---|
| 2006/0043636 A1 | 3/2006 | Hsueh |
| 2006/0175730 A1 | 8/2006 | Merkel |
| 2010/0029796 A1 | 2/2010 | Alderson |
| 2011/0236519 A1 | 9/2011 | Skertchly |
| 2016/0200018 A1 | 7/2016 | Make et al. |
| 2017/0129146 A1 | 5/2017 | Zeng |

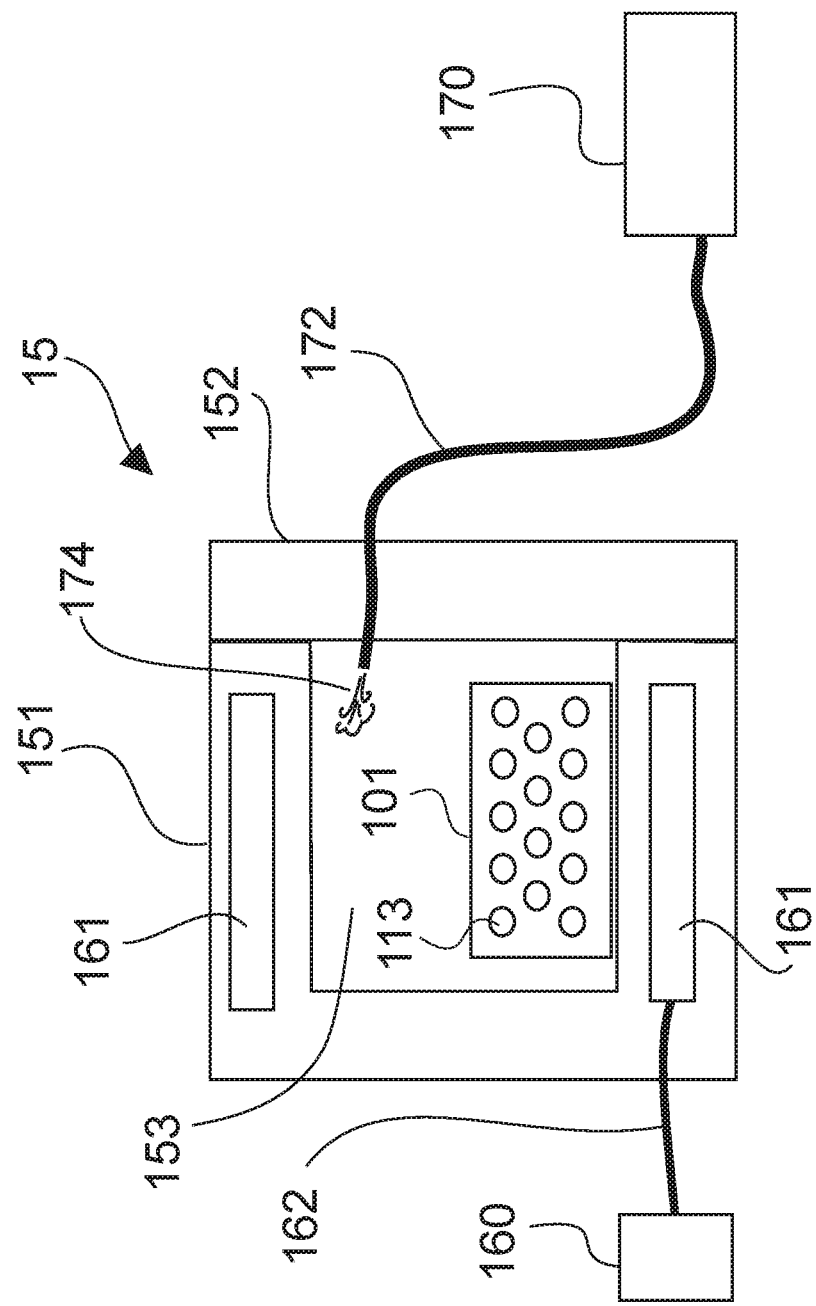

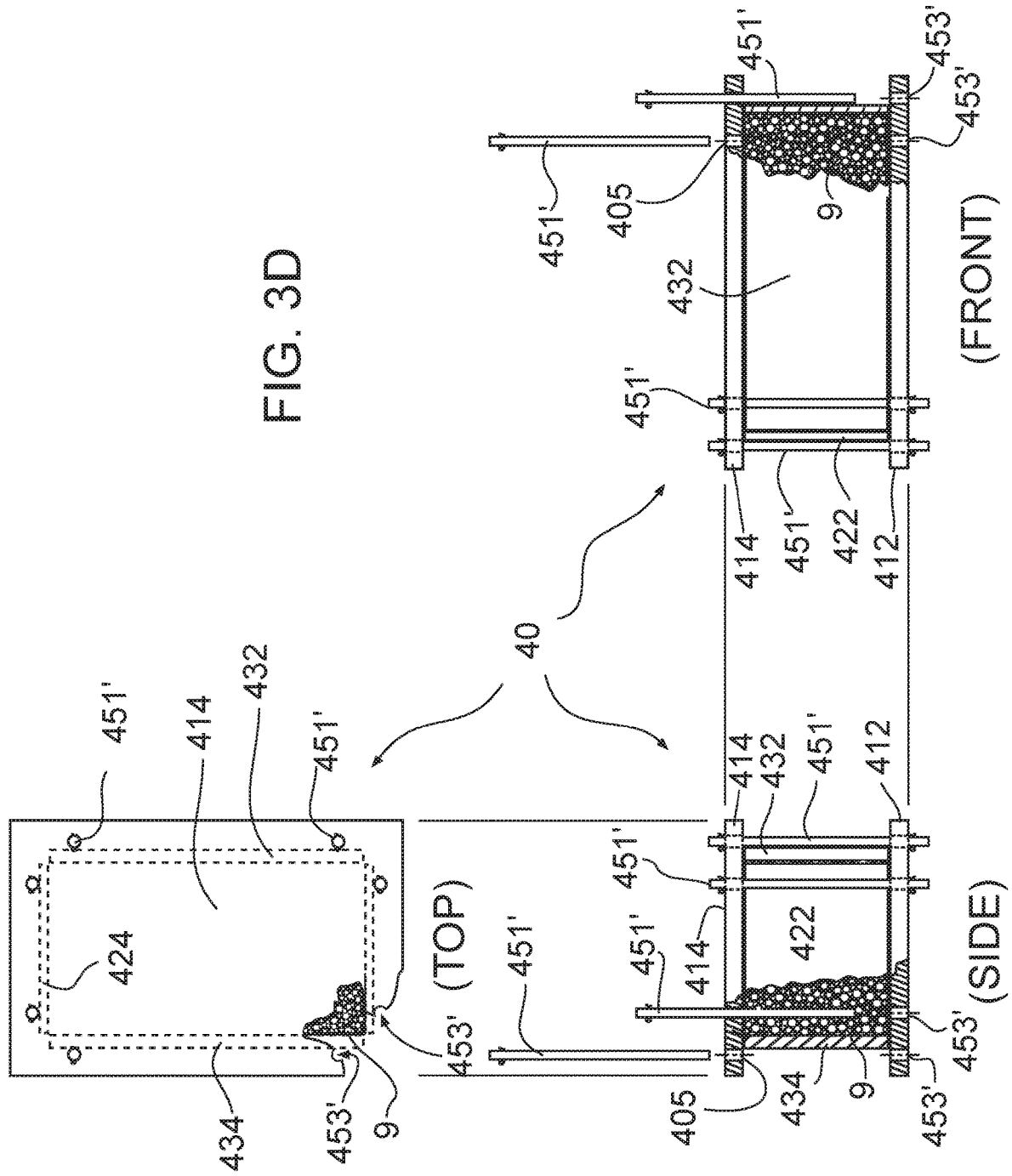

METHOD AND APPARATUS TO PRODUCE AUXETIC FOAM

CROSS-REFERENCE TO CO-PENDING APPLICATIONS

The present invention claims the benefit of the following co-pending U.S. patent application which is commonly owned with the present application, the entire contents of the co-pending application being incorporated herein by reference thereto: U.S. Patent Application Ser. No. 62/508,186, entitled "Method And Apparatus To Produce Auxetic Foam," filed on May 18, 2017.

TECHNICAL FIELD

This disclosure relates to methods and apparatuses for handling polymer foams. More particularly, this disclosure relates to auxetic foams and methods and apparatuses to produce auxetic foams.

BACKGROUND

Foam is used everywhere in our world. Many if not most of the items people come into contact with daily contain some foam. Foam provides a buffer between hard surfaces and our bodies. Foam is also used in numerous other applications from medical applications to protecting items during shipping. There are many types of foam and they come in many densities.

Conventional manufactured foams have uniform physical properties and positive Poisson's ratios. In applications that require foam structures with different properties in different regions, multiple pieces of foam may be joined, glued, laminated, fused or in some other manner combined to create a foam structure with differing physical properties in different portions of the structure. Poisson's ratio refers to the signed ratio of transverse strain to axial strain. In conventional materials, including conventional foams, the material tends to expand in a direction perpendicular to the direction of compression. Conversely, when a conventional material is stretched, it tends to contract in a direction transverse to the direction of stretching. An ordinary rubber band is a commonplace example of an item that exhibits a positive Poisson's ratio, in that it can be stretched until it becomes noticeably thinner.

SUMMARY

In contrast to conventional materials, auxetic materials have negative Poisson's ratios. That is, with respect to tensile loads, auxetic materials undergo transverse expansion when stretched in an axial direction. As for compressive loads, auxetic materials undergo transverse contraction when compressed in the axial direction. In view of these properties, auxetic foams have many potential applications.

Conventional foam, i.e., foam having a positive Poisson's ratio, can be converted to auxetic foam by undergoing one or more treatments in accordance with various methods. Some methods for converting regular foam to auxetic foam involve deforming the foam into a compressed state and then applying at least one of a chemical treatment and a thermal treatment to the compressed foam. Such thermal, chemical, and thermo-chemical treatments may induce plastic deformations in the foam's microstructure. So treated, the foam's equilibrium density is increased as compared to the untreated foam. Moreover, the treated foam exhibits auxetic properties not present in the untreated foam.

An apparatus according to an embodiment for processing polymer foam includes a compression apparatus, a mold, and a fastening device. By pressing opposing segments of the mold itself toward one another with the foam in between, large quantities of foam can be compressed in one or more dimensions and enclosed in the compressed state inside the mold in a manner conducive to undergoing thermal and/or chemical treatment processes to impart auxetic properties to the foam.

The compression apparatus according to an embodiment includes three pairs of opposing compression surfaces. At least one of the compression surfaces in the first pair moves in relation to the other along a first axis between first expanded and compressed positions. At least one of the compression surfaces in the second pair moves in relation to the other along a second axis between second expanded and compressed positions. At least one of the compression surfaces in the third pair moves in relation to the other along a third axis between third expanded and compressed positions. Each pair of opposing compression surfaces has a piston-cylinder device. A hydraulic fluid in each piston-cylinder device can be activated to urge the corresponding compression surfaces toward one another.

The mold according to an embodiment includes three pairs of opposing mold segments. Each mold segment has a mold surface that faces toward the foam being compressed and enclosed in the mold. In an embodiment, the mold segments are flat plates. The mold surfaces, when combined, delineate a rectangular volume or cavity enclosed by the mold. At least one of the mold segments in the first pair moves in relation to the other along the first axis between open and closed positions. At least one of the mold segments in the second pair moves in relation to the other along the second axis between second open and closed positions. At least one of the mold segments in the third pair moves in relation to the other along the third axis between third open and closed positions.

In various embodiments, the fastening device includes eight bolts or pins inserted through holes in one of the mold segments and into holes in the opposite mold segment. The eight bolts or pins and corresponding holes are arranged with two bolts or pins adjacent to each corner of one side of the mold; one bolt along one edge of the corner, and another bolt along the other edge of the corner. The eight bolts are near the perimeter of the mold and the remaining four mold segments fit inside the perimeter of the mold when the bolts are engaged. During the compression processes, corresponding mold segments are pushed into the mold, past the holes, and then the bolts or pins are inserted through the holes. In the case of bolts, a threaded portion on each bolt interfaces with threads, formed in a corresponding hole in the mold, in a corresponding nut, or the like. In the case of pins, a cotter pin, clip, or bent wire is inserted through each pin to restrain the movement of the pin with respect to the opposing mold segments having the holes through which the bolts or pins are inserted. When the compressed foam inside the mold expands, for example due to inherent elasticity in the foam, this causes the foam to press against the opposing mold segments. The mold segments are thus pressed outward against the bolts or pins. With the bolts or pins fixed in place, the mold segments are held in place with the foam on the inside and the bolts or pins on the outside.

The compression apparatus compresses the foam by pressing each pair of the opposing mold segments towards each other with the foam being arranged in between the opposing mold faces of the opposing mold segments. After the foam has been compressed in all three axes, the compression apparatus is in the compressed position in all three axes and the mold, likewise, is in the closed position in all three axes. At this point, the fastening device is engaged to secure the mold segments together. Then, when the compressive forces supplied by the compression apparatus are alleviated and ultimately removed, the fastening device continues to hold the mold segments in the closed position in all three axes.

The mold is then removed from the compression apparatus and transferred into a pressure vessel. Inside the pressure vessel, holes in the mold permit a treatment gas containing carbon dioxide to penetrate into the compressed foam enclosed in the mold. The foam undergoes a treatment process whereby the treatment gas alters small-scale structural characteristics of the foam.

As a result of the treatment of the compressed foam, the treated foam has auxetic properties. It can be removed from the mold and put to use in a multitude of useful applications.

The forces applied to any given volume of foam and the amounts by which the foam is compressed while being processed can be controlled to impart desired mechanical properties to the produced foam. Friction between the apparatus and the foam can be significantly reduced. A mold can be removably incorporated into the compressing apparatus. The step of transferring a compressed foam, while in its compressed state, from within a compression apparatus into a mold can be alleviated. Attendant difficulties can be reduced or eliminated, including introduction of large frictional forces on sliding surfaces of the foam, introduction of unwanted stresses and strains into the compressed foam, and manufacturing bottlenecks arising from inefficient utilization of specialized machinery. Large quantities of auxetic foam having consistent and uniform properties can be produced efficiently. The Poisson's ratio and density of discrete portions of finished foam shapes can be reliably predicted and controlled to achieve uniform and non-uniform mechanical properties within a single continuous quantity of foam.

BRIEF DESCRIPTION OF THE DRAWINGS

The following description is given with respect to the attached drawings and may be better understood by reference to non-limiting examples shown in the drawings, wherein:

FIG. 1C is a side plan view of another apparatus in accordance with an embodiment;

FIG. 3D is an orthogonal projection showing three views (top, side, and front) in partial cutaway of an apparatus in accordance with an embodiment;

DETAILED DESCRIPTION OF EMBODIMENTS

Figure 1A:
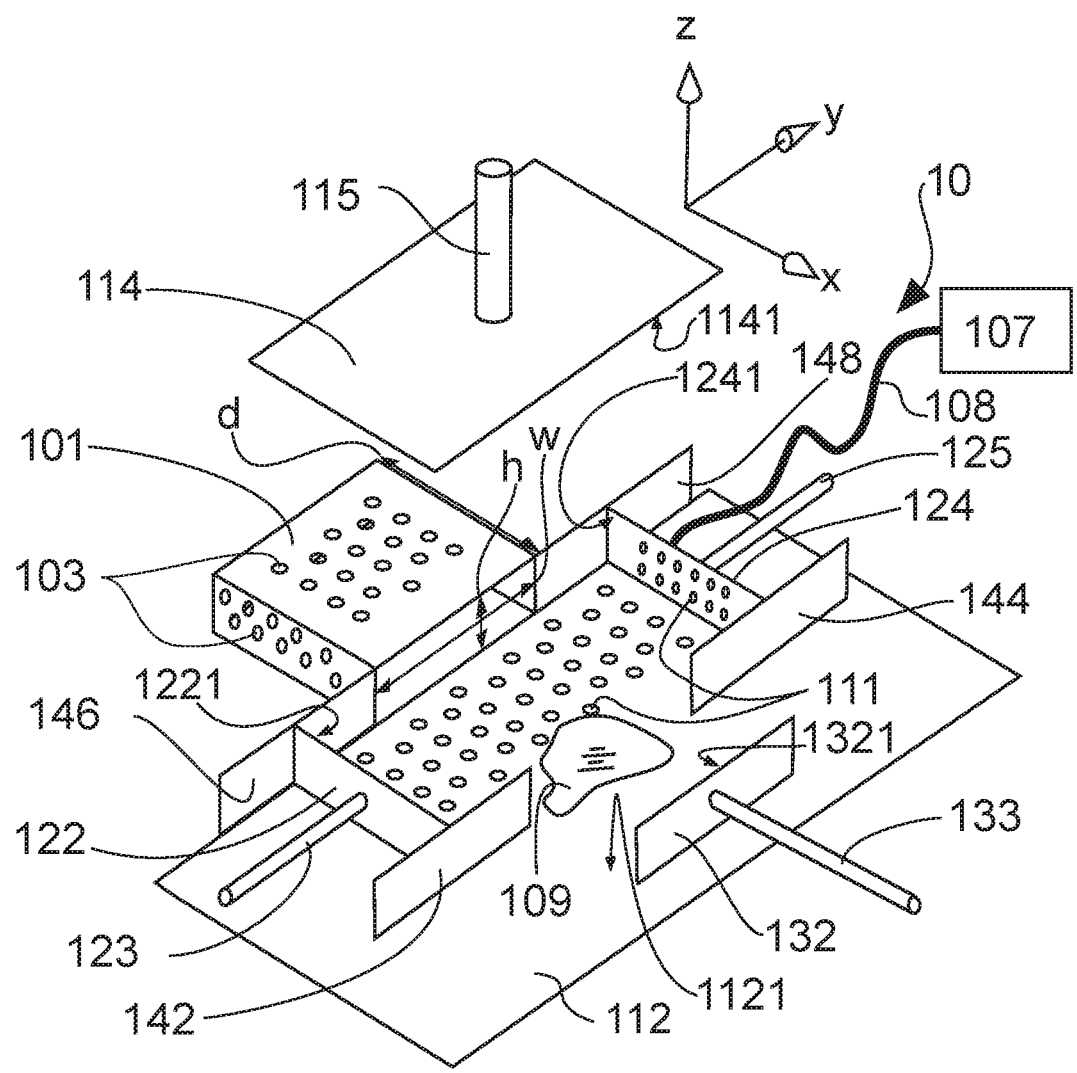
FIG. 1A is a perspective view of an apparatus for applying three axis compression in accordance with an embodiment.

Referring now to FIGS. 1A, 1B, 1C, and 1D, a first apparatus 10 in accordance with a first embodiment for compressing foam has a work plate 112 that provides a work surface 1121 on which untreated foam can be placed and compressed. To start, an untreated foam rectangle is placed on the work surface 1121 between a left-side compression plate 122 and a right-side compression plate 124 and between guide plates including a front-left guide plate 142, a front-right guide plate 144, a rear-left guide plate 146, and a rear-right guide plate 148. Note that the side compression plates 122, 124 are pulled back far enough to allow the foam to be placed in the first apparatus 10 without deforming the foam from its equilibrium shape and size. Once the foam is placed in first apparatus 10, a top compression plate 114 is lowered in a first axis (here, the z axis) parallel to a top compressing rod 115, thereby compressing the foam between the top compression plate 114 and the bottom compression plate 112. The top and bottom compression plates 112 and 114 compress the foam between them such that the foam's thickness in the first axis is reduced from a first initial thickness to a first compressed thickness less than or equal to a height h of the opening of a mold 101. In various embodiments, the first compressed thickness is from 0.1% to 20% smaller than the height h defined by the opening of mold 101. In an embodiment, the first compressed thickness is 10% smaller than the height h.

Next, the side compression plates 122 and 124 compress the foam in a second axis (here, the y axis) parallel to a left-side compressing rod 123 and a right-side compressing rod 125 such that the thickness of the foam in the second axis is reduced from a second initial thickness to a second compressed thickness less than or equal to a width w of the opening of the mold 101. In various embodiments, the second compressed thickness is from 0.1% to 20% smaller than the width w defined by the mold 101. In an embodiment, the second compressed thickness is 10% smaller than the width w.

The foam is then moved into the mold 101 by a front compression plate 132 and compressed along a third axis (here, the x axis) parallel to a front compressing rod 133 in the same process. The movement of the compression plate 132 compresses the foam from a third initial thickness in the third axis to a third compressed thickness less than or equal to a depth d of a cavity of mold 101. In various embodiments, the third compressed thickness is from 0.1% to 20% smaller than the depth d defined by mold 101. In an embodiment, the third compressed thickness is 10% smaller than the depth d.

Any number of mechanisms can be used to close the mold once the foam has been placed in it. In some embodiments, sliding doors are used. In others, a single hinged plate swings shut. In still others, a lid slides with the front compression plate 132 and remains affixed to the mold 101 even after the front compression plate 132 has been retracted.

Note that the compressing rods 115, 123, 125, 133 can use any mechanism to drive their respective plates such as but not limited to a pneumatic, hydraulic, or mechanical drive mechanism. In FIG. 1A, each compression rod is shown as a cylinder or a cylindrically shaped rod. However, other shapes may be used to push the plates such as oval rods, square rods and/or tubes. In some embodiments, one or more of the top compressing rod 115, the left compressing rod 123, the right compressing rod 125, and the front compressing rod 133, is part of a piston-cylinder device such as a hydraulic cylinder, a pneumatic cylinder, or a spring-loaded cylinder.

It will be understood that the directional and positional references used herein (e.g., top, bottom, left, right, front, rear) are only for illustrative purposes and may be reversed, altered, replaced, or eliminated in other embodiments. Thus, in some embodiments the z-axis as portrayed in the figures is aligned with a gravity direction, while in other embodiments, it is not. In some embodiments, only one of the opposing compression surfaces in a given pair of compression surfaces has a corresponding compressing rod or actuator to apply the compressive force in the corresponding direction and the other compression surface is stationary. This is the case with the bottom compression surface 1121 being stationary and the top compression surface 1141 opposing the bottom compression surface in FIG. 1A. However, some embodiments further include a bottom compressing rod opposite the top compressing rod 115, by which the bottom compression surface 1121 of the bottom compression plate 112 may be moved along the z axis.

The mechanism to drive the compression plates does not need to be the same in all axes, although in some embodiments it is. In some embodiments, the compressing rods 115, 123, 125, 133 move by linear translation. In other embodiments, the net linear displacement for one or more of compression plates 112, 114, 122, 124, 132 is achieved by a non-linear movement of a drive mechanism such as by extension of a cam, rotation of a lever, or the like.

It also should be pointed-out that in some embodiments the foam will rub against one or more surfaces including the bottom compression surface 1121 of the bottom plate 112, the top compression surface 1141 of the compression plate 114, the left compression surface 1221 of the compression plate 122, the right compression surface 1241 of the compression plate 124, or any adjoining surfaces of the guide plates 142, 144, 146, 148, and interior surfaces of the mold 101. In some embodiments, surfaces of the plates 112, 114, 122, 124, 142, 144, 146, 148 and interior surfaces of the mold 101 are made of or coated with one or more materials having a low coefficient of friction. In some embodiments, the coefficient of static friction is from about 0.2 to 0.3. In some embodiments, the coefficient of static friction is 0.25 or less. In some embodiments, other mechanisms are used, alone, or in combination with low-friction materials, to reduce friction between first compression apparatus 10 and the foam being processed. Such low-friction materials according to various embodiments include highly polished stainless steel, and metal coated with a hard, low-friction material such as nitride or diamond. In some embodiments, polytetrafluoroethylene (PTFE), e.g., Teflon™ is used on one or more of the plates 112, 114, 122, 124, 142, 144, 146, 148 including on the surfaces 1121, 1141, 1221, 1241, and on interior surfaces of the mold 101. The examples provided are not an exhaustive list of low-friction materials that could be used, but are exemplary of various embodiments.

Advantageously, providing one or more surfaces with a low coefficient of friction may permit the foam to slide on the surface with application of minimal force. Furthermore, providing a smooth, low-friction surface may minimize the magnitude of shear forces imposed on the foam as it slides. Providing a smooth, low-friction surface also may help minimize deformations of the foam other than the desired axial compression. This can result in finished auxetic foams having more uniform mechanical properties. Where the foam encounters frictional forces during compression internal stress concentrations may arise. This may lead to stress gradients between some portions of the foam, such as the edges, and others, such as the internal bulk of the foam. In some embodiments, it may be desirable to minimize such internal stress gradients so that the final properties of the foam, following any chemical, thermal, or thermo-chemical treatment, are as uniform as possible throughout. Thus, the quality of the compression process and the quality of the process for enclosing the foam in mold 101 may be controlled so as to permit desired quantities of treated foam having predictable properties to be repeatedly and efficiently produced. This may also lead to reduced waste in the production of auxetic foams.

In some embodiments, an array of small holes 111 is placed in one or more of the working surfaces of the plates 112, 114, 122, 124, 142, 144, 146, 148, and a compressed gas 107 is injected between the compression and working surfaces and the foam being processed to reduce friction between the foam and apparatus 10. In an embodiment, the friction-reducing gas 107 is compressed air. In other embodiments, carbon dioxide, or other gases or fluids are used. In some embodiments, a hose 108 carries gas 107 from an external source, such as an air compressor or compressed gas cylinder, to one or more of plates 112, 114, 122, 124, 142, 144, 146, 148. In still other embodiments, no such holes or friction-reducing gas are utilized.

The size, shape, number, and distribution of holes 111 are not limited to those shown in the Figures. In some embodiments, holes 111 all have identical sizes and shapes. In other embodiments, one or more of holes 111 has a different size or shape. In some embodiments, holes 111 are ¼ inch or less in diameter. In other embodiments, holes 111 greater than ¼ inch are used. In some embodiments, holes 111 are 1/16 inch in diameter. In other embodiments, holes 111 are 1/8 inch in diameter, arrayed on a 1-inch center grid. In some embodiments, holes 111 are rounded or beveled. Benefits of such rounding and/or beveling can be twofold: smooth transitions from holes 111 to the compression surface or working surface in which holes 111 are formed can provide cleaner, more stable flow of the friction-reducing compressed gas; moreover, the foam may be less likely to snag on holes 111 when holes 111 are rounded or beveled. In yet another embodiment, gas permeable materials are used for all or portions of the apparatus 10 that contact the foam.

In some embodiments, the friction-reducing compressed gas is introduced between mold 101 and the foam beginning just before compression of the foam is to be performed. In some embodiments, the friction-reducing compressed gas is turned-on only for the surfaces against which the foam may slide during a particular phase of the compression process. In various embodiments, the friction-reducing gas 107 is permitted to escape into the atmosphere surrounding the apparatus 10 after flowing out of the holes 111.

It is not required that the same friction-reduction device be used on all the surfaces of apparatus 10 that come into contact with the foam. In some embodiments, a lubricant 109 is provided on one or more of the working surfaces and/or on the interior of the mold 101. In some embodiments, lubricant 109 is a liquid such as oil. In other embodiments, lubricant 109 is a solid, such as graphite. In still other embodiments, a combination of solid and liquid lubricants is used in conjunction with friction-reducing compressed gas 107 and holes 111.

It should also be noted that any of the compression plates 112, 114, 122, 124, 132 may be brought into close proximity or even touching the foam to control the foam from being pushed out in one axis as it is being compressed in another axis or to stop the foam from buckling.

Figure 1B:
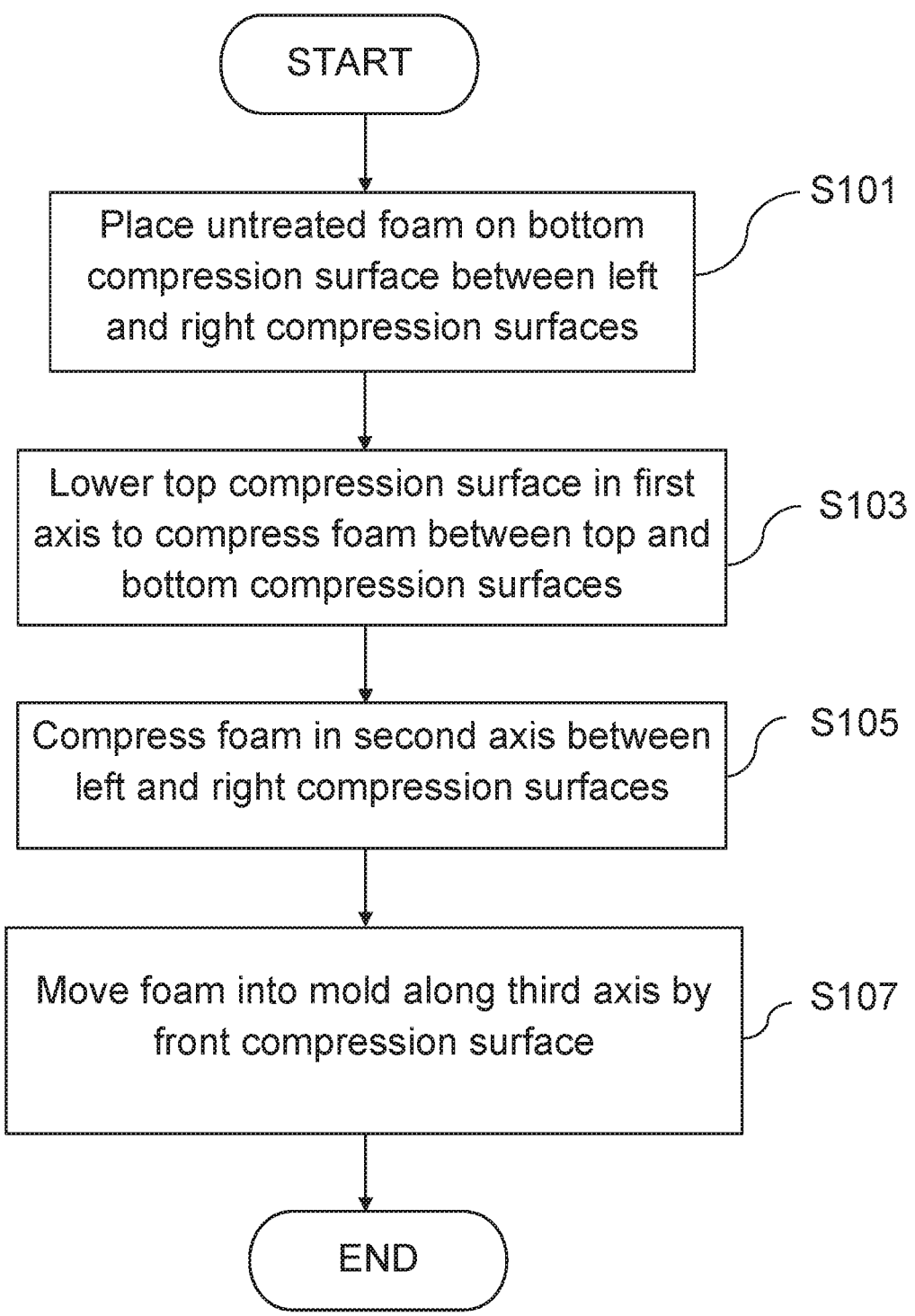
FIG. 1B is a diagram showing steps of a method for use with the apparatus of FIG. 1A in accordance with an embodiment.

Referring now to FIG. 1B, a process in accordance with an embodiment starts with step S101, placing untreated foam on the bottom surface 1121 between the left compression plate 122 and the right compression plate 124 and between the left guide plates 142, 146 (where present) and the right guide plates 144, 148 (where present). At step S103, the compression plate 114 is lowered in the first axis to compress the foam between the bottom compression plate 112 and the top compression plate 114. In other embodiments, the bottom compression plate 112 is raised toward the top compression plate 114. In still other embodiments, the bottom and top compression plates 112 and 114 both move towards one another. At step S105, the foam is compressed in the second axis by movement of the left compression plate 122 and the right compression plate 124 towards one another. In other embodiments, only one of the left side and right side compression plates 122, 124 moves, while the other remains stationary. At step S107, the front compression surface 1321 of the front compression plate 132 moves along the third axis to push the foam into the mold 101. By the same motion along the third axis, the front compression plate 132 also compresses the foam against an interior surface of mold 101 opposite the front compression surface 1321. In various embodiments, the mold 101 is fixed in relation to the apparatus 10, so that the plate 132 and the mold 101 provide opposing surfaces between which the foam is compressed in the third axis.

Figure 1D:
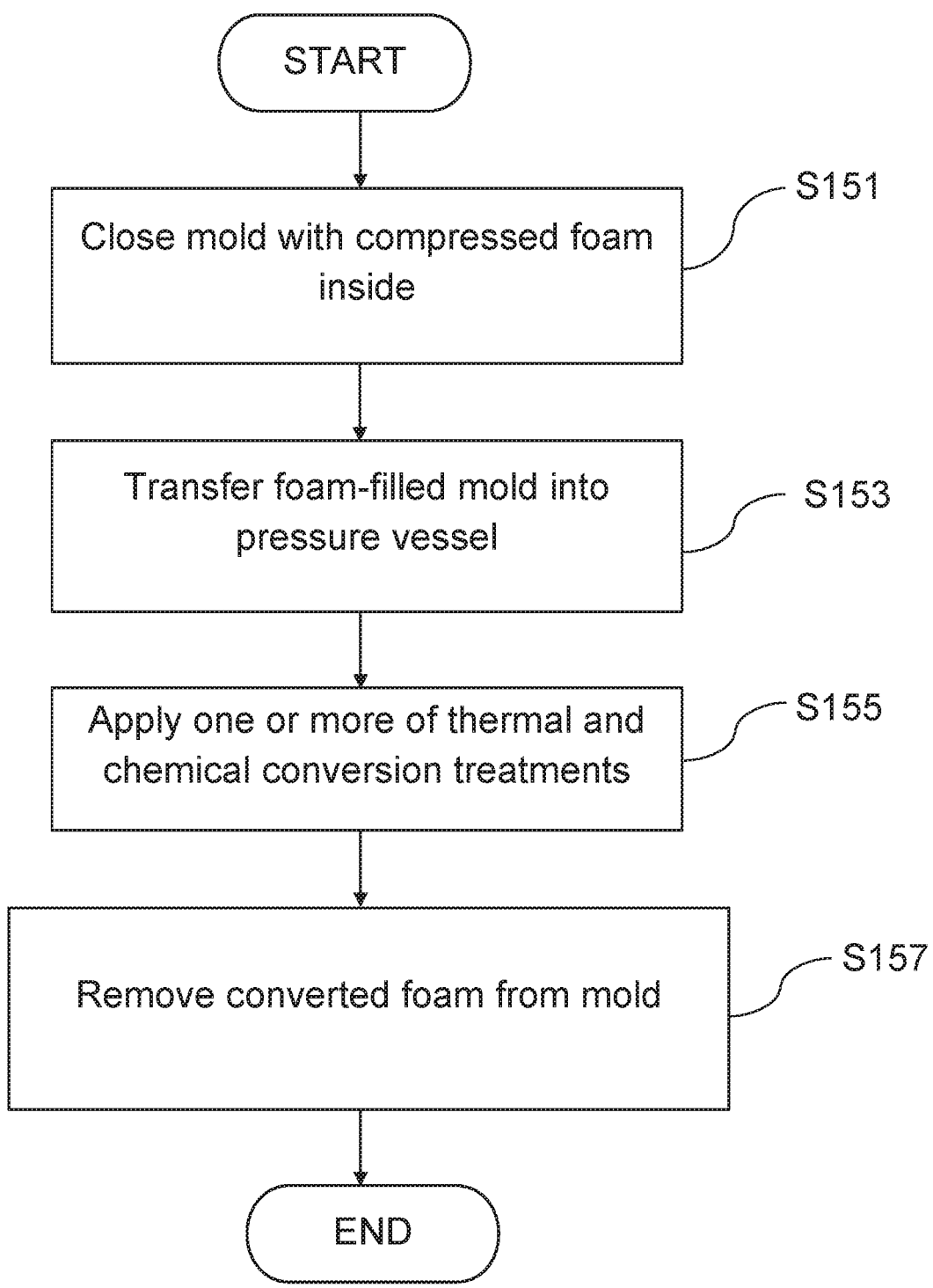
FIG. 1D is a diagram showing steps of a method in accordance with an embodiment.

Referring now to FIGS. 1C and 1D, in an embodiment, the foam-filled mold 101 is transferred into a pressure vessel 15. In an embodiment, the pressure vessel 16 has a body 151 and a door 152. The door 152 is sealed with the body 151 and the foam-filled mold 101 is subjected to one or more treatment processes. In various embodiments, these treatment processes are used to convert the conventional foam to auxetic foam.

In some embodiments, while maintaining compression, the foam is heated to a predetermined temperature. The compressed foam may remain at the predetermined temperature for a period of time, before being cooled. At the elevated temperature, one or more chemical substances comprised in the foam transitions to a relaxed state. Next, as the foam cools, the one or more chemical substances comprised in the foam transitions to a glassy state with a fixed shape. After such thermal processing, the overall foam remains in a new fixed shape having a density higher than its initial density. The mechanical compression is then released and the net result is a volume of auxetic foam.

In other embodiments, while maintaining compression, the flexible foam is subjected to a compressed gas that can be dissolved from a few tenths of a percent by weight to several tens of percent by weight, resulting from favorable polymer-gas intermolecular interaction. Exemplary gases include carbon dioxide, nitrogen, or any volatile organic chemical. The dissolved gas generates additional free volume in the foam and lowers the minimum temperature required for the foam to relax so as to undergo permanent deformation under mechanical compression.

In still other embodiments, while maintaining compression, the flexible foam is subjected to both an elevated temperature and a compressed gas.

These embodiments and still other embodiments include materials, apparatuses, processes, and processing parameters as discussed in U.S. Patent Application Publication No. US 2017/0129146 A1, published on May 11, 2017 from U.S. patent application Ser. No. 15/410,873, titled "Material Systems and Methods of Manufacture for Auxetic Foams," which is incorporated by reference in its entirety; International Patent Application No. PCT/US2015/041713 filed on Jul. 23, 2015, titled "Material Systems and Methods of Manufacture for Auxetic Foams," which is incorporated by reference in its entirety; and U.S. Patent Application Ser. No. 62/029,225 filed on Jul. 25, 2014, titled "Auxetic Foams and Methods of Manufacture," by Changchun Zeng and Yan Li, which is incorporated by reference in its entirety. For example, in various embodiments, the chemical treatment gas is compressed CO2 gas as discussed in the publications naming Zeng and Li as inventors. In some embodiments, the pressure vessel is a pressure chamber as discussed in Zeng and Li. In some embodiments, a bulk matrix polymer of the foam comprises a soft domain and a hard domain as discussed in Zeng and Li. In some embodiments, the bulk matrix polymer of the foam comprises a soft domain, a hard domain, and a filler polymer as discussed in Zeng and Li.

In a chemical treatment process according to an embodiment, a high-pressure chemical treatment gas 174 is introduced into an interior 153 of the pressure vessel 152. In some embodiments, treatment gas 174 is carbon dioxide. In other embodiments, other substances are used. In an embodiment, treatment gas 174 is supplied to pressure vessel 15 from a gas supply 170, such as a compressed gas cylinder, by a gas supply line 172. In other embodiments, other means are used to provide the treatment gas 174 to the interior 153 of the pressure vessel 15. In some embodiments, holes 103 in mold 101 permit treatment gas to penetrate the foam inside mold 101. In some embodiments, the pressure inside the pressure vessel 15, containing the mold 101 enclosing the foam and also containing the treatment gas 174, is raised to a pressure from 500 to 1,500 psi above an ambient atmospheric pressure. In some embodiments, the pressure inside pressure vessel 15 is 1,000 psi. In other embodiments, the pressure is less than 500 psi. In still other embodiments, the pressure is above 1,500 psi.

In a thermal treatment process according to an embodiment, the power supply 160 provides electric current to the heater 161 by power supply line 162. The heater 161 supplies thermal energy to raise the temperature of the interior 153 of the pressure vessel 15, the mold 101, and the foam within the mold 101. In other thermal treatment processes, other devices are used to supply thermal energy. In some embodiments, the holes 103 in the mold 101 facilitate heat transfer to and within the foam.

In some embodiments, chemical treatment processes are combined with thermal treatment processes. Following the chemical and/or thermal treatment processes, the mold 101 is removed from the pressure vessel 15 and the converted foam is removed from the mold 101. The converted foam may then be made available for any of various useful applications.

Referring to FIG. 1D, at step S151, the mold 101 is closed with compressed foam inside. At step S153, the mold 101 is transferred into the pressure vessel 15. At step S155, one or more thermal and/or chemical treatments is applied to the compressed foam, thereby converting the compressed conventional foam into auxetic foam. At step S157, the converted foam is removed from the mold 101.

Advantageously, the mold 101 is separable from the first compression apparatus 10. Thus, the compressed foam enclosed in the mold 101 may be treated in the pressure vessel 15 after the mold 101 is removed from the compression apparatus 10. Moreover, while the foam in the mold 101 undergoes one or more treatments inside the pressure vessel 15, another mold is fixed to the compression apparatus 10, thereby permitting the first compression apparatus 10 to be utilized to compress additional foam into additional molds with great efficiency, irrespective of the amount of time that may be consumed by post-compression treatment processes such as those performed in the pressure vessel 15 at S155.

Figure 2:
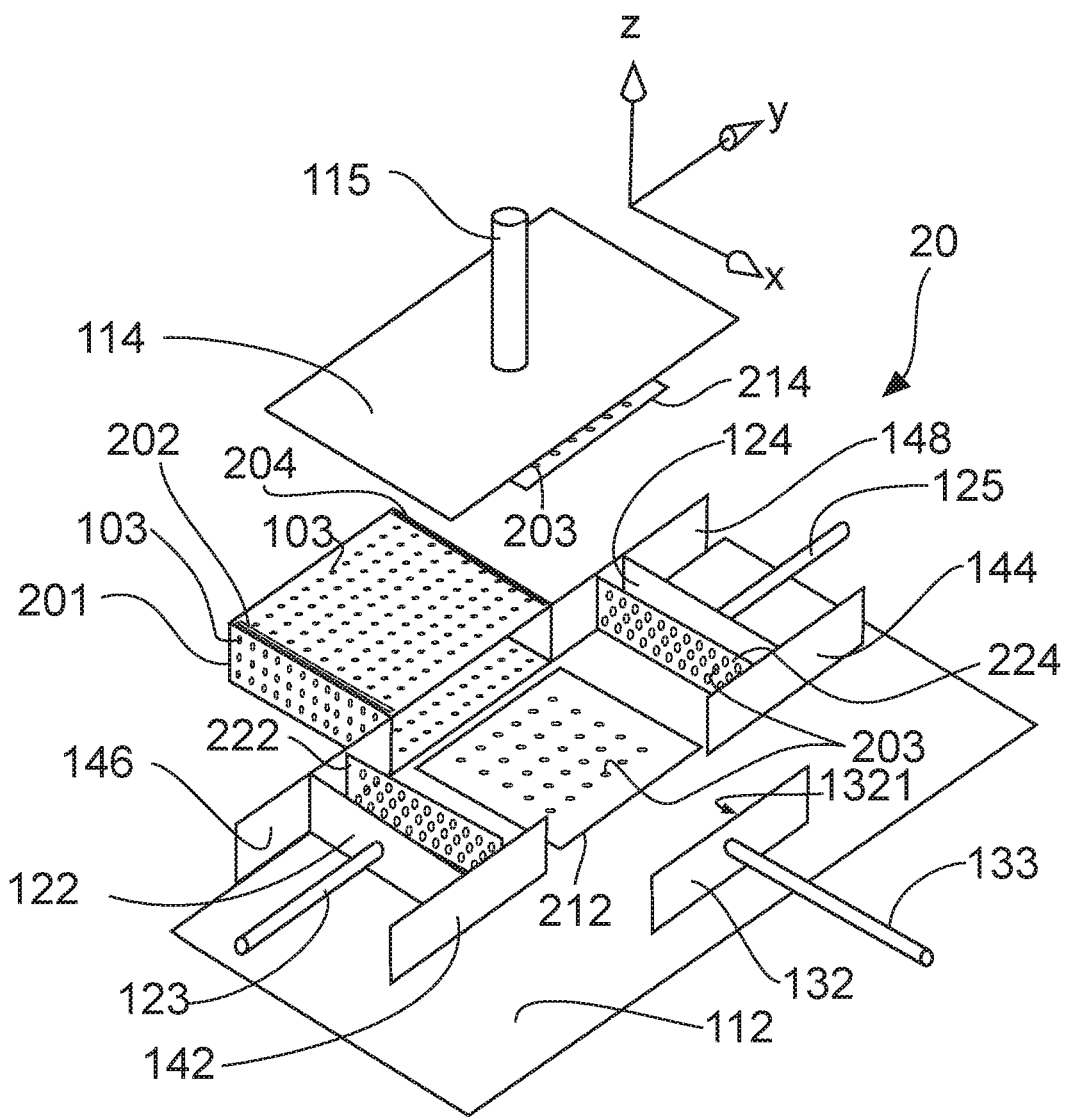
FIG. 2 is a is a perspective view of an apparatus in accordance with another embodiment.

FIG. 2 shows a second apparatus 20 in accordance with a second embodiment to compress and enclose foam for processing in a mold 201. The exemplary apparatus 20 includes sliding guides or shims 212, 214, 222, 224 to reduce friction between apparatus 20 and the foam during the compression process. Note that in various embodiments, any mechanism may be used to hold the bottom sliding guide 212, the top sliding guide 214, the left side sliding guide 222, and the right side sliding guide 224 in place before the foam is placed in the mold 201, if needed. In some embodiments, the mold 201 includes holes or slots to permit one or more of the sliding guides 212, 214, 222, 224 to be removed from mold 201 before the foam is further processed. For example, as shown in FIG. 2, left and right side slots 202, 204 permit left and right side sliding guides 222, 224 to be removed from the cavity of the mold 201 before the foam is further processed. Also note that while the sliding guides 212, 214, 222, 224 are shown as each being one piece for the respective surface of each of the compression plates 112, 114, 122, 124, multiple sliding guides can be placed on any working surface in accordance with other embodiments.

In some embodiments, holes 203 are formed in the sliding guides 212, 214, 222, 224 to allow chemical, thermal, or thermo-chemical treatments to be performed after the compressing and enclosing processes, without removing the sliding guides 212, 214, 222, 224 from inside the mold 201. In some embodiments, the holes 203 are formed by drilling. In some embodiments, the holes 203 are rounded or beveled, so as to minimize or prevent the foam from snagging and to allow the fluids (such as the treatment gases) to flow smoothly. In some embodiments, a compressed gas 107 may be introduced between one or more of the bottom compression surface 1121, the top compression surface 1141, the left side compression surface 1221, the right side compression surface 1241 and one or more of the bottom side sliding guide 212, the top side sliding guide 214, the left side sliding guide 222, and the right side sliding guide 224 to reduce friction in like manner as discussed above with respect to FIGS. 1A and 1B, except that rather than sliding occurring on surfaces of the foam itself, the sliding guides 212, 214, 222, 224 abut the foam so that sliding occurs at the interface between the sliding guides 212, 214, 222, 224 and one or more of the compression plates 112, 114, 122, 124 and/or the interior surfaces of the mold 201. Thus in some embodiments, the sliding guides 212, 214, 222, 224 both protect the foam and facilitate sliding of the foam during compression and/or during transfer of the foam into the mold 201.

Still referring to FIG. 2, in some embodiments, the sliding guides 212, 214, 222, 224 have no holes 203. In other embodiments, one or more of the sliding guides 212, 214, 222, 224 has holes 203 and one or more of the other sliding guides 212, 214, 222, 224 has no holes 203. The size, shape, number, and distribution of the holes 203 are not limited to those shown in the Figures. In some embodiments, the holes 203 all have identical sizes and shapes. In other embodiments, one or more of the holes 203 has a different size or shape. In some embodiments, the holes 203 are ¼ inch or less in diameter. In other embodiments, the holes 203 are greater than ¼ inch in diameter. In some embodiments, the holes 203 are 1/16 inch in diameter. In other embodiments, the holes 203 are ⅛ inch in diameter, arrayed on a 1-inch center grid. In some embodiments, the holes 203 are rounded or beveled. In some embodiments, the holes 203 are not the same size or shape as the holes 111 in the compression plates 112, 114, 122, 124, while in other embodiments they are. In some embodiments, the sliding guide holes 203 do not have a number or distribution corresponding to the number and distribution of the compression plate holes 111, although in other embodiments they do. In some embodiments, the sliding guide holes 203 are not the same size or shape as the holes 103 in the mold 201, while in other embodiments they are. In some embodiments, the sliding guide holes 203 do not have a number or distribution corresponding to the number and distribution of the mold holes 103, although in other embodiments they do.

In accordance with some embodiments, the sliding guide holes 203 permit the treatment gases to pass through the sliding guides 212, 214, 222, 224 and into the compressed foam inside the mold 201. Thus, in some embodiments, the sliding guides 212, 214, 222, 224 remain inside the mold 201 throughout a subsequent thermal and/or chemical treatment process. It is not necessary that every face of the foam have a corresponding sliding guide 212, 214, 222, or 224. Rather, in some embodiments, only one or a small number of the sliding guides 212, 214, 222, 224 is provided to one or more surfaces and a sliding guide 212, 214, 222, 224 is not provided to one or more other surfaces. In some embodiments, one or more of the sliding guides 212, 214, 222, 224 has a same size and shape as at least one of the plates 112, 114, 122, 124. In other embodiments, one or more of the sliding guides 212, 214, 222, 224 has a size larger or smaller than at least one of the plates 112, 114, 122, 124. In other embodiments, one or more of the sliding guides 212, 214, 222, 224 has a shape different from at least one of the plates 112, 114, 122, 124. In some embodiments, one or more of the sliding guides 212, 214, 222, 224 is made of a gas-permeable material, including but not limited to a screen, a mesh, and a textile.

Figure 3A:
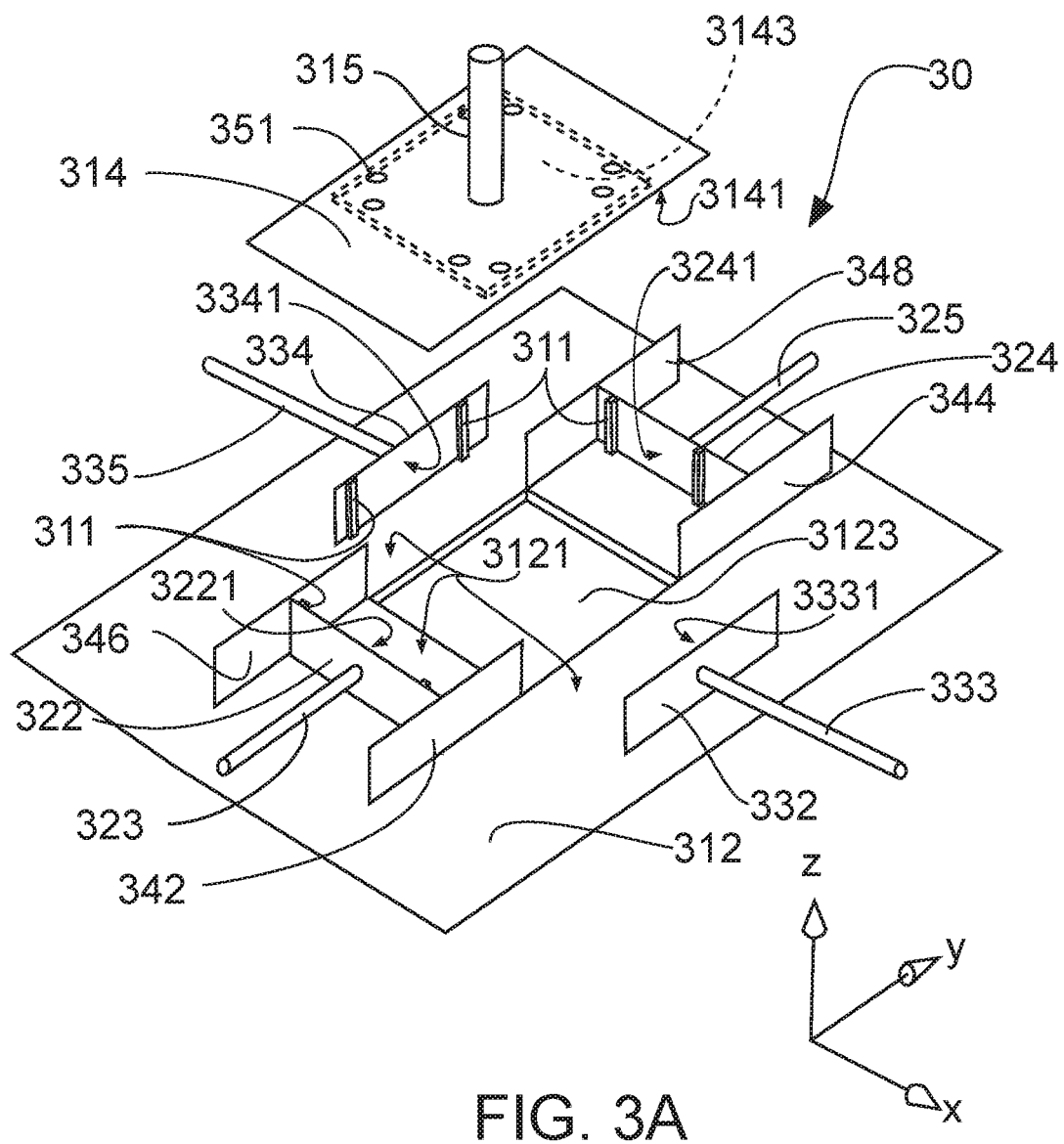
FIG. 3A is a perspective view of an apparatus in accordance with another embodiment.
Figure 3B:
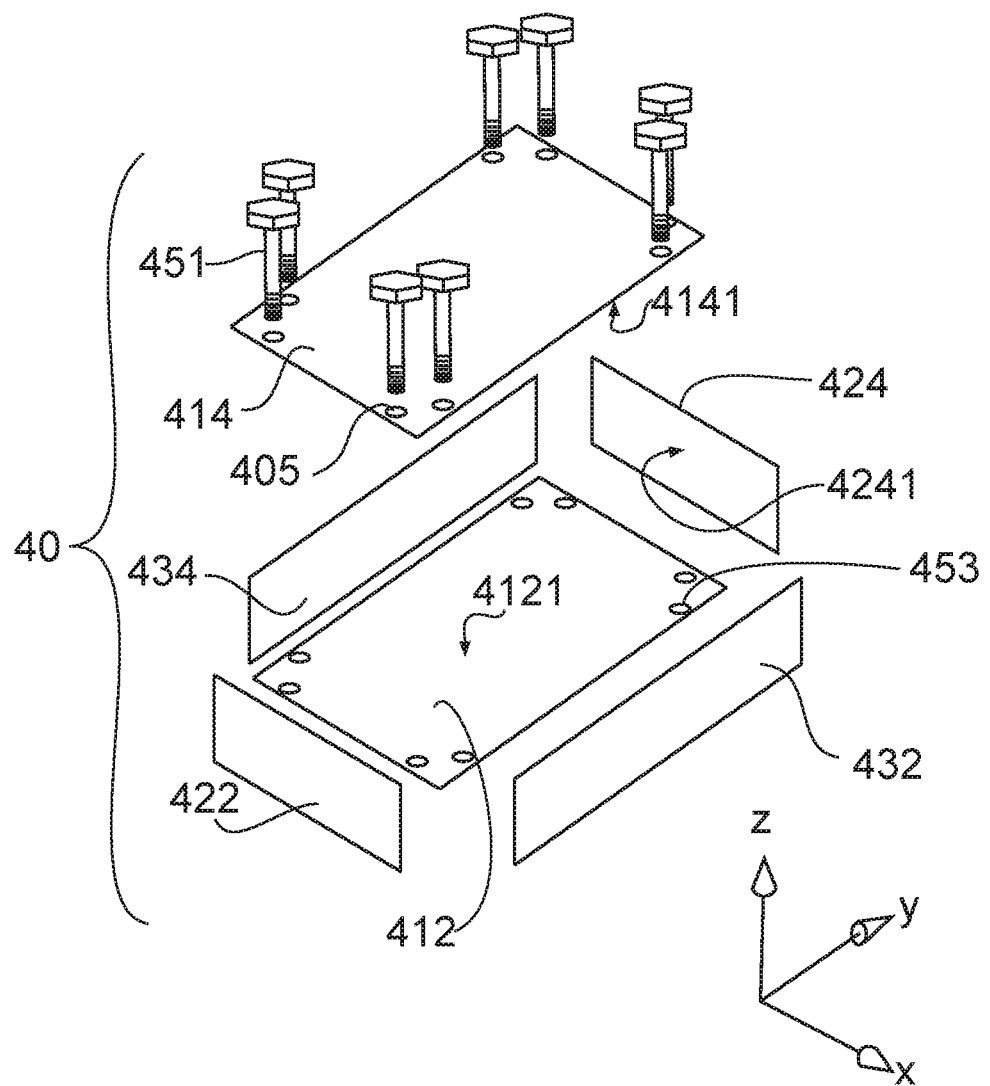
FIG. 3B is a perspective view of a rectangular mold and fasteners in accordance with another embodiment.

Referring now to FIGS. 3A and 3B, in a third exemplary embodiment, instead of compressing the foam and then placing it into the first mold 101 or the second mold 201, a segmented mold 40 is combined with a third compression apparatus 30. The third compression apparatus 30 is much like the first compression apparatus 10 and the second compression apparatus 20 shown in FIGS. 1A and 2. However, mold 40 shown in FIG. 3B comprises separable segments in the form of plates, including a bottom segment 412, a top segment 414, a left side segment 422, a right side segment 424, a front segment 432, and a rear segment 434. The bottom and top mold segments 412, 414 work in concert with bottom and top compression surfaces 3121, 3141 of bottom and top compression plates 312, 314 to compress the foam along a first axis. The left and right side mold segments 422, 424 work in concert with left and right side compression surfaces 3221, 3241 of left and right side compression plates 322, 342 to compress the foam along a second axis. The front and rear mold segments 432, 434 work in concert with front and rear compression surfaces 3321, 3341 of front and rear compression plates 332, 334 to compress the foam along a third axis.

In FIG. 3A, the base or bottom compression plate 312 of the third apparatus 30 includes a bottom depression 3123. Likewise, the top compression plate 314 includes a top depression 3143. Each of bottom and top depressions 3123, 3143 is sized to just fit the corresponding bottom and top mold segments 412, 414 shown in FIG. 3B. In various embodiments, the top mold segment 414 is held in place in the top depression 3143 by clips, snaps, or magnets, by suction, or by one or more other fastening means or adhesives such as glue, cement, or paste, or hook-and-loop fastener (e.g., Velcro®). In some embodiments, the bottom depression 3123 holds the corresponding bottom mold segment 412 substantially coplanar with the rest of the compression surface 3121 of the bottom compression plate 312. In like manner, the depression 3143 holds the corresponding top mold segment 414 substantially coplanar with the rest of the compression surface 3141 of the compression plate 314.

In some embodiments, a compression surface 4121 of the mold segment 412 and a compression surface the 4141 of the mold segment 414 are each offset no more than 1/16 inch from respective compression surfaces 3121, 3141 of plates 312, 314. In an embodiment, depressions 3123, 3143 are each 0.130 inches deep and mold segments 412, 414 are each 0.125 inches thick, such that mold segment 412 does not protrude beyond the compression surface 3121 of the base plate 312 and is within 0.005 inches of coplanar with the compression surface 3121, and such that the mold segment 414 does not protrude beyond the compression surface 3141 of the compression plate 314 and is within 0.005 inches of coplanar with the compression surface 3141.

The left and right side mold segments 422, 424 are placed on the respective side compression surfaces 3221, 3241 of the compression plates 322, 324. Similarly, the front and rear mold segments 432, 434 are place on the respective front and rear compression surfaces 3321, 3341 of the front and rear compression plates 332, 334. Note that in some embodiments, spacers 311 extend from one or more of the compression plates 312, 314, 322, 324 to allow for one or more of the bolts 451 to be introduced to fasten the mold 40 together after the foam is fully compressed but before the mold 40 is released from the compressive forces applied by the compression plates 312, 314, 322, 324, 332, 334. In some embodiments, the holes 351 in the top compression plate 314 allow for bolts 451 to be inserted into mold 40 to hold mold 40 closed after compression plates 312, 314, 322, 324, 332, 334 are removed. As discussed herein, the bolts 451 are considered to be a type of fastener. However, fasteners are not limited to bolts. Instead, fasteners can include any material, device, or arrangement by which one part is attached to another part, including, without limitation, screws, clips, pins, an adhesive, hook-and-loop fastener (e.g., Velcro®), and the like. Each bolt 451 is an example of an elongate member that extends parallel to the first axis between the first mold segments 412 and 414 to restrain movement of the second mold segments 422 and 424 along the second axis and movements of the third mold segments 432 and 434 along the third axis.

In operation, compression plates 312, 314, 322, 324, 332, 334 are pulled backward or moved away from the center and mold segments, i.e., plates 412, 414, 422, 424, 432, 434 are placed into compression apparatus 30. The piece or portion of foam to be compressed is then inserted in the space between the mold segments 412, 414, 422, 424, 432, 434. Some embodiments include guide plates 342, 344, 346, 348. In other embodiments, no guide plates are used. With the foam arranged in the space between the mold segments, the compressing rods 315, 323, 325, 333, 335 are driven to compress the foam in each axis. Once the foam is compressed, while maintaining the third compression apparatus 30 in the compressed state, the bolts 451 are used to hold the segmented mold 40 together with the compressed foam inside.

The segmented mold 40 shown in FIG. 3B is a non-limiting example that may be used with the third compression apparatus 30 shown in FIG. 3A. The segmented mold 40 is constructed of six plate-shaped segments: the bottom segment 412, the top segment 414, the left side segment 422, the right side segment 424, the front segment 432, and the rear segment 434. Non-limiting embodiments include mold segments made out of a metal such as carbon steel, stainless steel, or aluminum; however other rigid materials such as wood and plastic may be used. Still referring to FIG. 4, the bottom segment 412 has threaded holes 453 with threads to accept bolts 451 to secure the segments of the mold 40 together. The top segment 414 has holes 405 to allow bolts 451 to be fitted through to the bottom segment 412. The side segments 422, 424 and the front and rear segments 432, 434 have appropriate sizes and shapes to be arranged to sit inside the securing bolts 451, thus allowing the foam to be compressed in all three axes and securely enclosed within the segmented mold 40. Note that while the fastening device 450 including bolts 451, holes 405, and threaded holes 453 is shown, alternative fastening devices, including fasteners such as screws or locking pins, or adhesives are used in other embodiments. Still other embodiments use fastening devices including one or more clamps and/or straps to keep the segments of the mold 40 intact, thereby keeping the foam compressed inside the mold 40 once the compression forces supplied by the compression plates 312, 314, 322, 324, 332, 334 are removed.

In some embodiments, the fastening device 450 to fix the mold segments together in the closed position is engaged manually, for example, by manually inserting securing bolts 451 through holes 351 in the top compression plate 314, then through holes 405 in the top mold segment 414, and finally into threaded holes 453 in the bottom mold segment 412 where the securing bolts 451 are tightened in place. In other embodiments, the fastening device 450 engages automatically, for example, where mold the 40 includes male buckle or clip portions extending downward from the top segment 414 in substantially the same manner as the securing bolts 451, and the bottom segment 412 includes female buckle or clip portions, which, by cooperating with the male buckle or clip portions, engage automatically to secure the top and bottom mold segments 412, 414 in their compressed state. In other embodiments, other fastening devices are used, including devices integral to and separate from one or more segments of the mold 40.

Figure 3C:
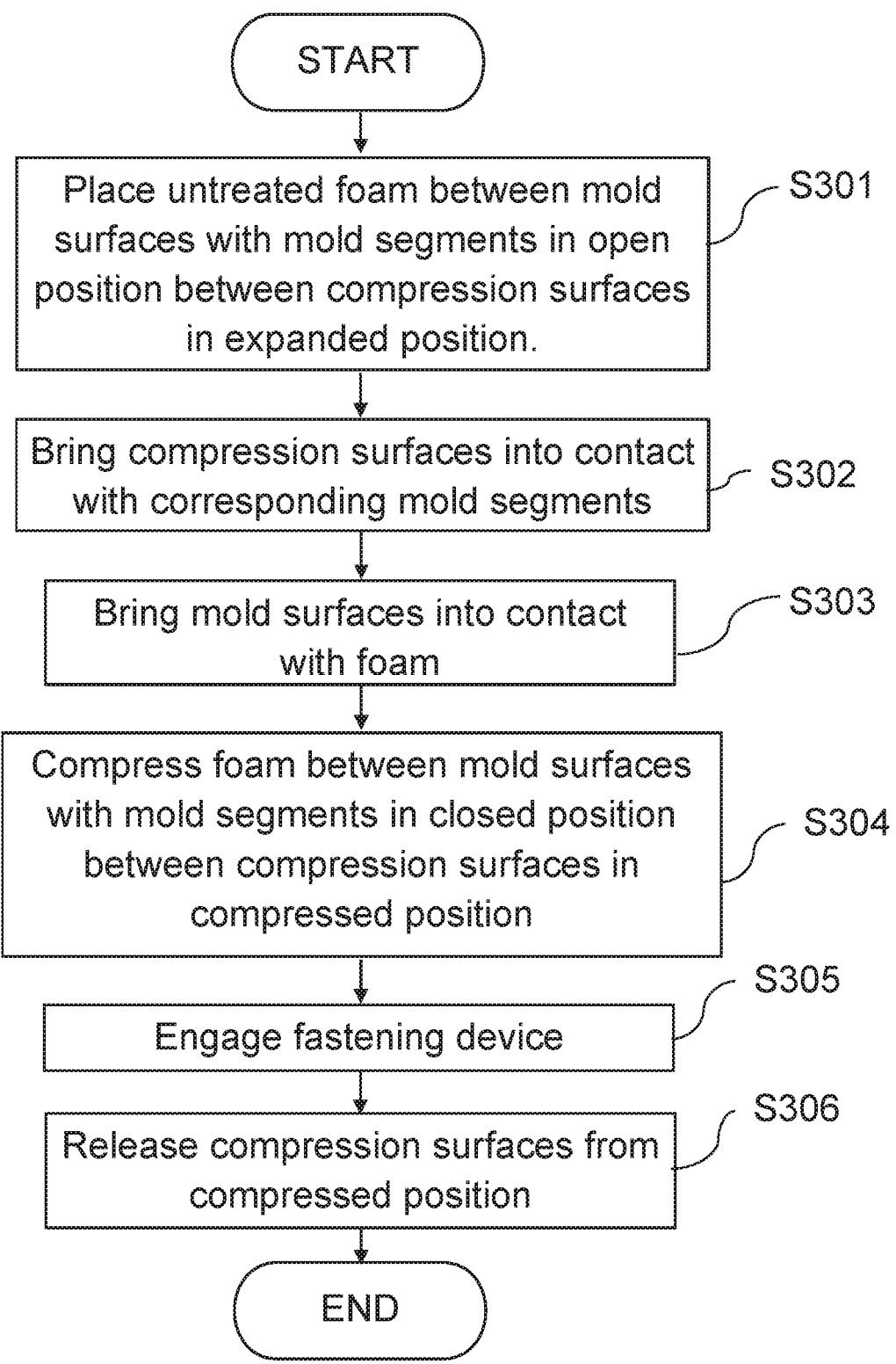
FIG. 3C is a diagram showing steps of a method in accordance with an embodiment.

FIG. 3C illustrates a process 3 according to an embodiment utilizing an apparatus 4, comprising the third compression apparatus 30 and the segmented mold 40. FIGS. 4A through 4G show a plan view of the apparatus 4, comprising compression apparatus 30 and mold 40 at various steps of the process 3 illustrated in FIG. 3C.

Referring to FIG. 3C, at step S301 untreated foam is placed between the mold surfaces, with the mold segments being in the open position, the compression surfaces being in the expanded position, and the mold segments being disposed between the corresponding compression surfaces. At step S302 the each of the compression surfaces is brought into contact with its corresponding mold segment. At step S303 the mold surfaces are brought into contact with the foam. At step S304 the foam is compressed between the mold surfaces until the mold segments reach the closed position and the compression surfaces reach the compressed position. At step S305 the fastening device is engaged. At step S306 the compression surfaces are released from to the compressed position.

Figure 3E:
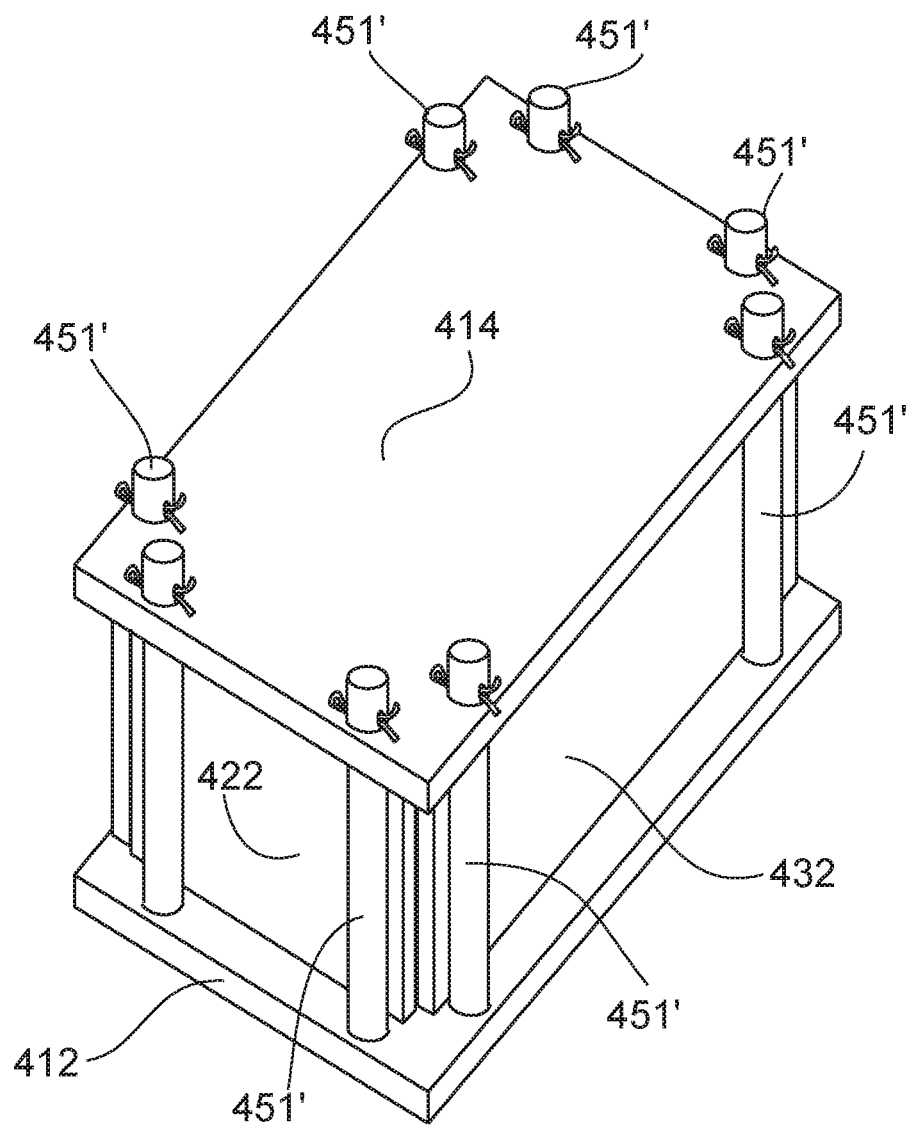
FIG. 3E is a perspective view of an apparatus in accordance with an embodiment.

FIG. 3D shows orthogonal projections of the mold 40 in partial cutaway. FIG. 3E shows a perspective view of the mold 40 in a fully closed position. The mold 40 as shown in FIGS. 3D and 3E is similar to the mold 40 as shown in FIG. 3B, except that in FIGS. 3D and 3E pins 451' are used in place of the bolts 451 as fasteners to secure the mold 40 together with the foam block 9 inside. In some embodiments, the pins 451' are clevis pins. In some embodiments the pins 451' are secured in place in the holes 405 and 453' using cotter pins, bent wire, wings, toggles or the like. Accordingly, where in one embodiment the hole 453 is threaded, in another embodiment the hole 453' is smooth. Each pin 451' is an example of an elongate member that extends parallel to the first axis between the first mold segments 412 and 414 to restrain movement of the second mold segments 422 and 424 along the second axis and movements of the third mold segments 432 and 434 along the third axis.

Figure 3F:
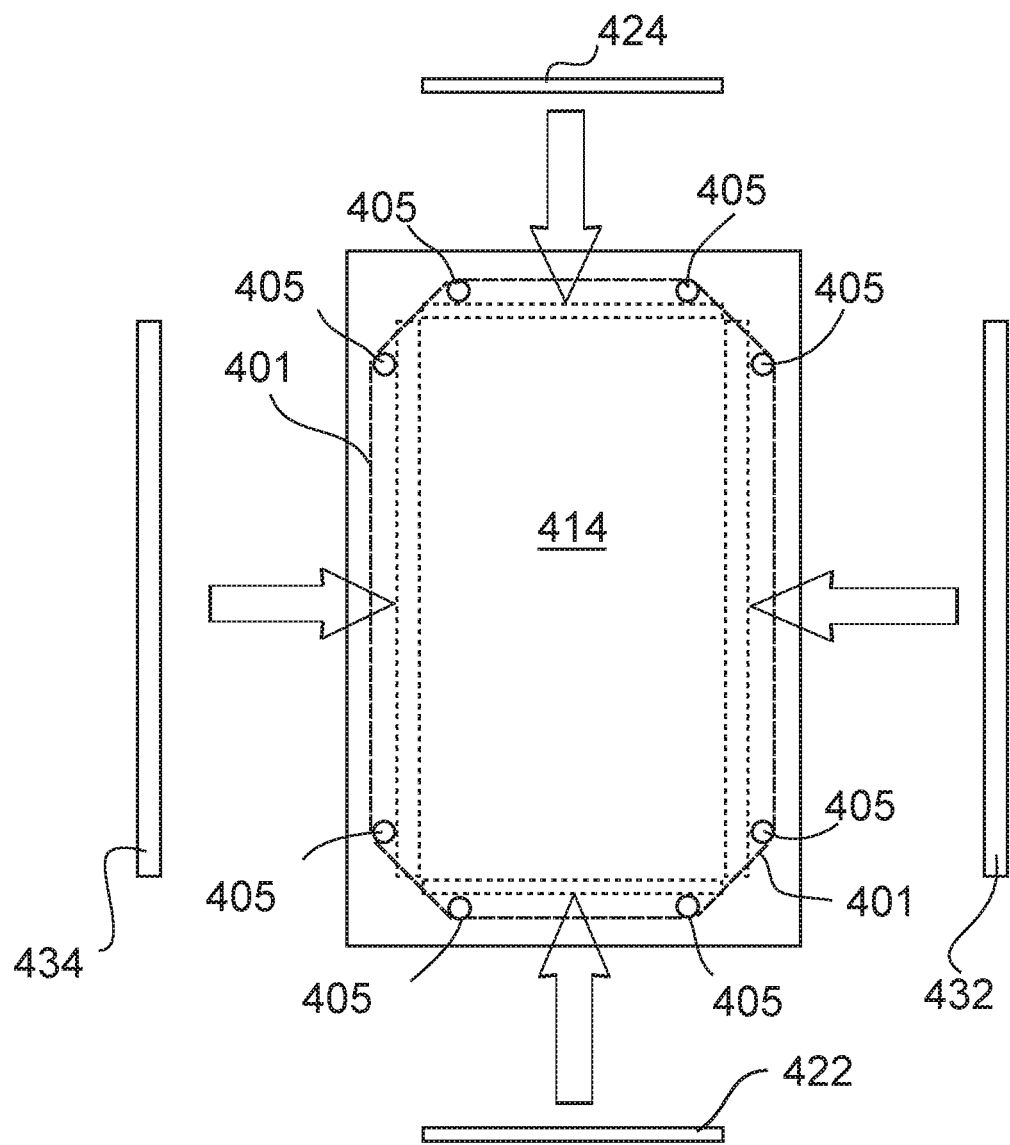
FIG. 3F is a top plan view of a rectangular mold in accordance with an embodiment.

As shown in FIGS. 3D, 3E, and 3F, because the holes 405 and 453' are near the open edges of the opposing bottom segment 412 and top segment 414 of the mold 40, during the compression process the left side segment 422 and right side segment 424 are pushed into the mold 40 past the holes 405 and 453 before the pins 451' are inserted to secure the left and right side segments 422 and 424. Likewise, during the compression process the front segment 432 and rear segment 434 are pushed into the mold 40 past the holes 405 and 453 before the pins 451' are inserted to secure the front and rear segments 432 and 434. Advantageously, in some embodiments, a single set of fasteners (e.g., the set of eight pins 451') are extended along a single axis to secure the mold 40 together along three orthogonal axes.

FIG. 3F shows the mold 40 from a top plan view. The top mold segment 414 is visible. A convex hull 401 circumscribes the holes 405 in the top mold segment 414. Each of the left side segment 422, the right side segment 424, the front segment 432 and the rear segment 434 is shown in an initial position outside the convex hull 401. In various embodiments, the left side segment 422 and the right side segment 424 are pressed toward one another until each crosses-over from outside the convex hull 401, and past the adjoining holes 405, before reaching their respective final positions on the inside side of the holes 405. Likewise, in various embodiments, the front segment 432 and the rear segment 434 are pressed toward one another until each crosses-over from outside the convex hull 401, and past the adjoining holes 405, before reaching their respective final positions on the inside side of the holes 405. Since the mold segments are pushed past the holes 405, when the compressive force is released with the foam 9 on the inside, the foam 9 pushes the mold segments back toward the outside, against the bolts 451 or the pins 451'.

Referring again to FIG. 3A, it can be seen that in some embodiments, during the process of compressing the conventional foam in one direction—for example, along the z axis by means of the bottom compression plate 312 and top compression plate 314 being driven toward one another—the conventional foam tends to expand in axes orthogonal to the compression axis—here, along the x and y axes. According to some embodiments, in the absence of a guide or restraint, this orthogonal expansion causes the conventional foam to slide on the compression surface 4121 of the bottom mold segment 412 and on the adjoining bottom compression surface 3121 of the bottom compression plate 312, extending across a boundary between the compression surface 4121 of the bottom mold segment 412 and the bottom compression surface 3121 of the bottom compression plate 312. Then, during the subsequent processes of compressing the conventional foam in the two orthogonal directions—here, along the x and y axes—the foam slides back across the boundary in the opposite direction, from the bottom compression surface 3121 of the bottom compression plate 312 to the compression surface 4121 of the bottom mold segment 412. The same goes for the compression surface 4141 of the top mold segment 414 and the adjoining top compression surface 3141 of the top compression plate 314.

In one embodiment, the mold 40 in the closed position has an interior volume five inches tall, six inches wide, and thirty-six inches long. In another embodiment, the mold 40 in the closed position has an interior volume that is three feet tall, three feet wide, and seven and one-half feet long. In other embodiments, the mold 40 in the closed position has an interior volume from one to twenty-four inches tall, from one to twenty-four inches wide, and from one to twenty-four inches long. In still other embodiments, the mold 40 in the closed position has an interior volume from one foot to thirty feet tall, from one foot to thirty feet wide, and from one foot to thirty feet long. In other embodiments, at least one interior dimension of the mold 40 in the closed position is less than one inch. In still other embodiments, at least one interior dimension of the mold 40 in the closed position is greater than thirty feet.

Figure 4A:
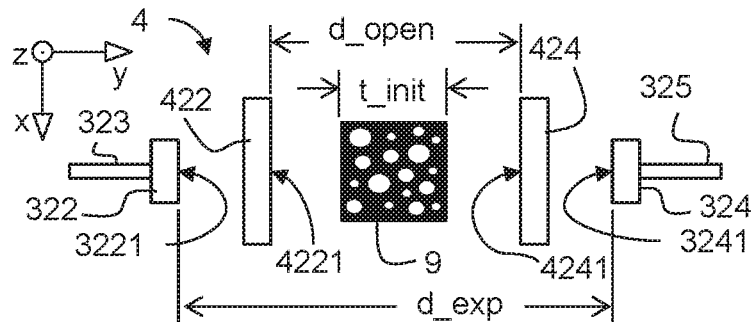
FIG. 4A is a top plan view of an apparatus in accordance with an embodiment.

FIG. 4A shows the apparatus 4 at step S301. A foam block 9 is between a mold surface 4221 of the mold segment 422 and a mold surface 4241 of the mold segment 424. The mold segment 422 is between the compression surface 3221 of the compression plate 322 and the foam block 9. The mold segment 424 is between the compression surface 3241 of the compression plate 324 and the foam block 9, opposite the mold segment 422. In an expanded position of the apparatus 30, the compression surfaces 3221, 3241 are spaced apart by a distance d_exp. In an open position of the segmented mold 40, the mold surfaces 4221, 4241 are spaced apart by a distance d_open. The foam block 9 has its equilibrium size and shape, with a thickness t_init in the direction of the y axis.

Figure 4B:
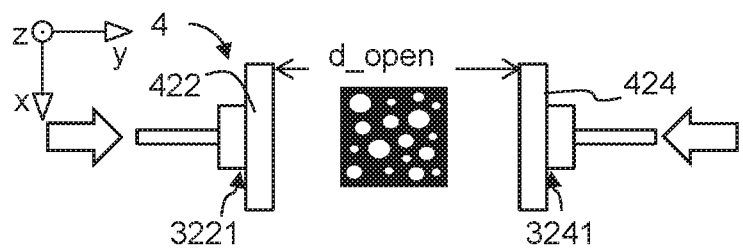
FIG. 4B is a further top plan view of the apparatus of FIG. 4A.

FIG. 4B shows the apparatus 4 at step S302. The compression plates 322 and 324 have moved toward one another. The compression surface 3221 is in contact with the mold segment 422. The compression surface 3241 is in contact with the mold segment 424. The mold segments 422, 424 are still spaced apart by a distance d_open. The segmented mold 40 is in the open position, but the compression apparatus 30 is no longer in the expanded position. The foam block 9 still has its equilibrium size and shape, having the thickness t_init in the direction of the y axis.

Figure 4C:
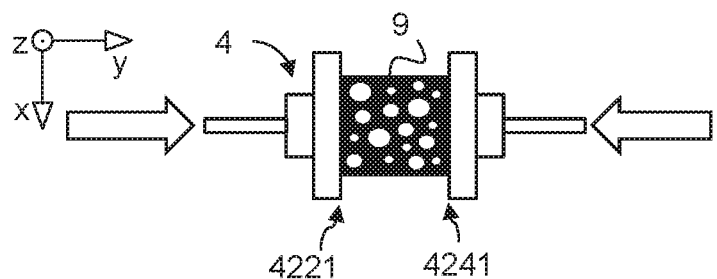
FIG. 4C is a further top plan view of the apparatus of FIG. 4B.

FIG. 4C shows the apparatus 4 at step S303. The compression plates 322 and 324 have moved further toward one another. The compression surface 3221 is in contact with the mold segment 422 and the mold surface 4221 is in contact with the foam block 9. The compression surface 3241 is in contact with the mold segment 424 and the mold surface 4241 is in contact with the foam block 9. The segmented mold 40 is no longer in the open position and the compression apparatus 30 is no longer in the expanded position.

Figure 4D:
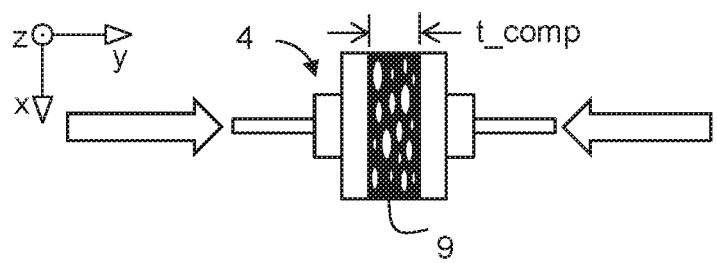
FIG. 4D is a further top plan view of the apparatus of FIG. 4C.

FIG. 4D shows the apparatus 4 at step S304. The compression plates 322 and 324 have moved even further toward one another. The compression surface 3221 is in contact with the mold segment 422 and the mold surface 4221 is in contact with the foam block 9. The compression surface 3241 is in contact with the mold segment 424 and the mold surface 4241 is in contact with the foam block 9. The segmented mold 40 is now in the closed position, the compression apparatus 30 is in the compressed position, and the foam block 9 has a compressed thickness t_comp in the direction of the y axis.

Figure 4E:
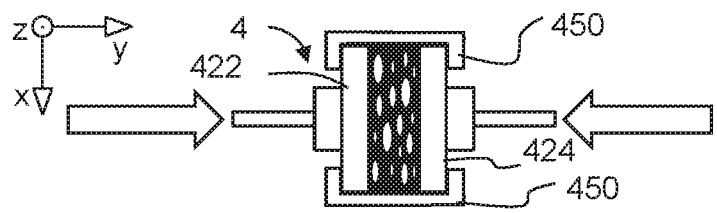
FIG. 4E is a further top plan view of the apparatus of FIG. 4D.

FIG. 4E shows the apparatus 4 at step S305. The compression apparatus 30 and the segmented mold 40 are in the same positions as in the preceding step, S304. However, the fastening device 450 has been engaged to retain the mold segments 422, 424 in the closed position with the foam 9 compressed inside the cavity bounded by the mold surfaces 4221, 4241.

Figure 4F:
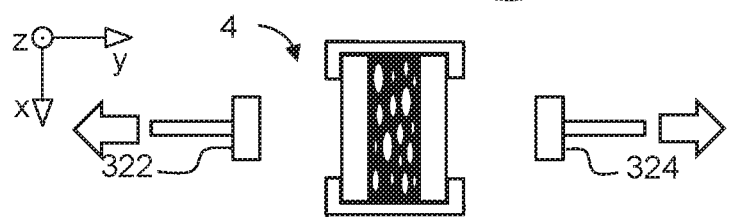
FIG. 4F is a further top plan view of the apparatus of FIG. 4E.

FIG. 4F shows the apparatus 4 at step S306. The compression plates 322 have moved from the compressed position back toward the expanded position. However, the fastening device 450 restrains movement of the mold segments 422, 424 in relation to one another, such that the foam 9 remains compressed inside the cavity bounded by the mold surfaces 4221, 4241, even in the absence of the compressive forces earlier applied by the compression apparatus 30. In embodiments where compression of the foam 9 is to be performed along only one axis, the segmented mold 40 in the closed position is now ready to be removed from the apparatus 30 to undergo further processing, such as that discussed with respect to FIGS. 1C and 1D. In other embodiments, i.e., where the foam 9 is to be compressed further along another axis, such further compressing along another axis may be undertaken in a manner substantially similar to the process described in relation to the y axis in FIGS. 3C and 4A-4F.

Figure 5:
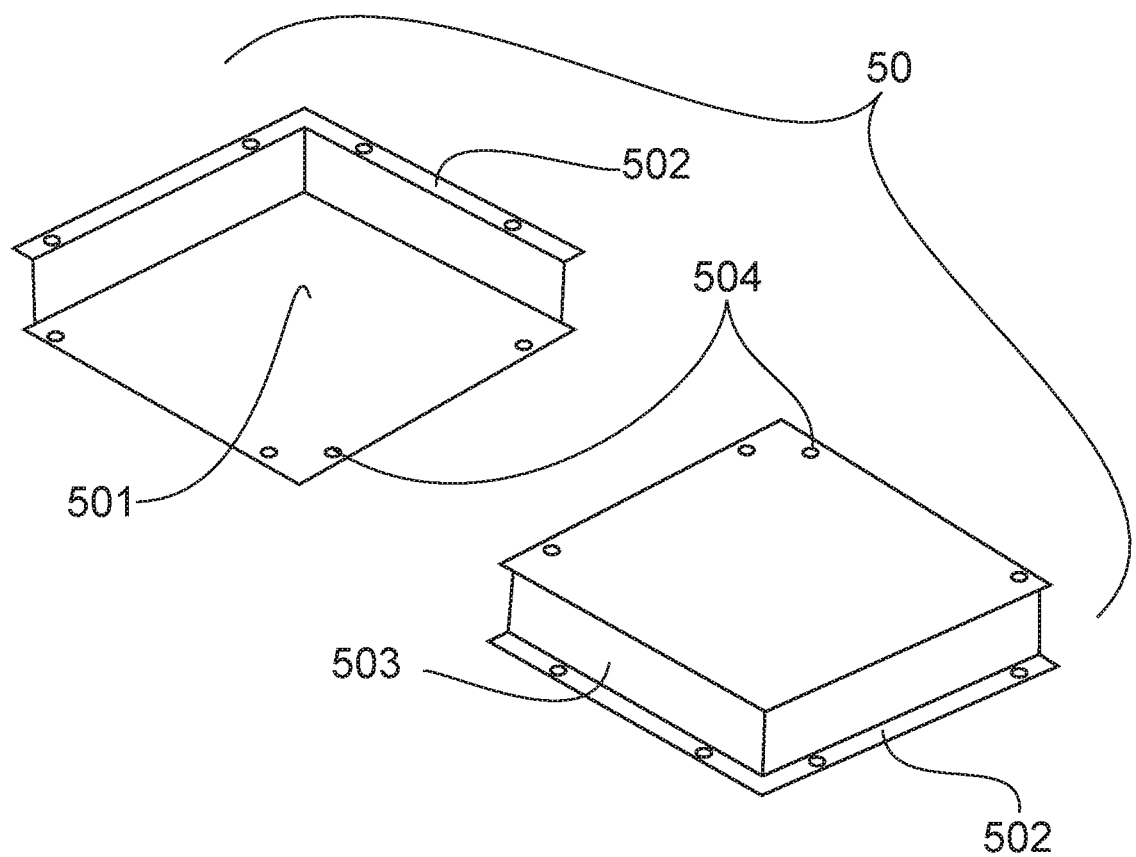
FIG. 5 is a diagram of a rectangular mold in accordance with another embodiment.

Referring now to FIG. 5, in still another embodiment, a two-piece mold 50 is made of two matching segments 501 and 503. A compressing apparatus similar to those shown in FIGS. 1 through 4 can be used to compress foam in the two-piece mold 50 in preparation for additional processing. The two-piece mold 50 includes a securing flange 502 to provide a mechanism for securing the two halves of the mold 50 together. The mold segments 501, 503 may be held together using screws, clips, pins, an adhesive, or any other fastener. In some embodiments, such fastening devices are inserted through holes 504 in the flanges 502. In other embodiments, the flanges are clamped together by other means.

In the embodiment shown in FIG. 5, mold segments 501, 503 are identical halves. However in other embodiments, molds may be comprised of dissimilar segments that cooperate to form a complete mold. While the mold segments 501, 503 as shown each have 3 interior faces against which the foam is compressed, other embodiments include molds having one, two, three, or more faces for any given segment of the mold. While a complete two-piece mold 50 is formed by the segments 501, 503, in other embodiments, a mold may be comprised of any number of separate mold segments.

Embodiments are not limited to rectangular geometries. Rather, the present disclosure also applies to other geometries including regular and irregular geometries, encompassing flat and/or curved surfaces having smooth and/or rough surface finishes. An untreated quantity of foam may have any three-dimensional shape. Likewise, a mold may have any three-dimensional shape (e.g., spherical, cylindrical, football, egg-shaped, bullet-shaped, irregular, etc.). Indeed, a converted quantity of foam may have any three-dimensional shape.

Figure 6A:
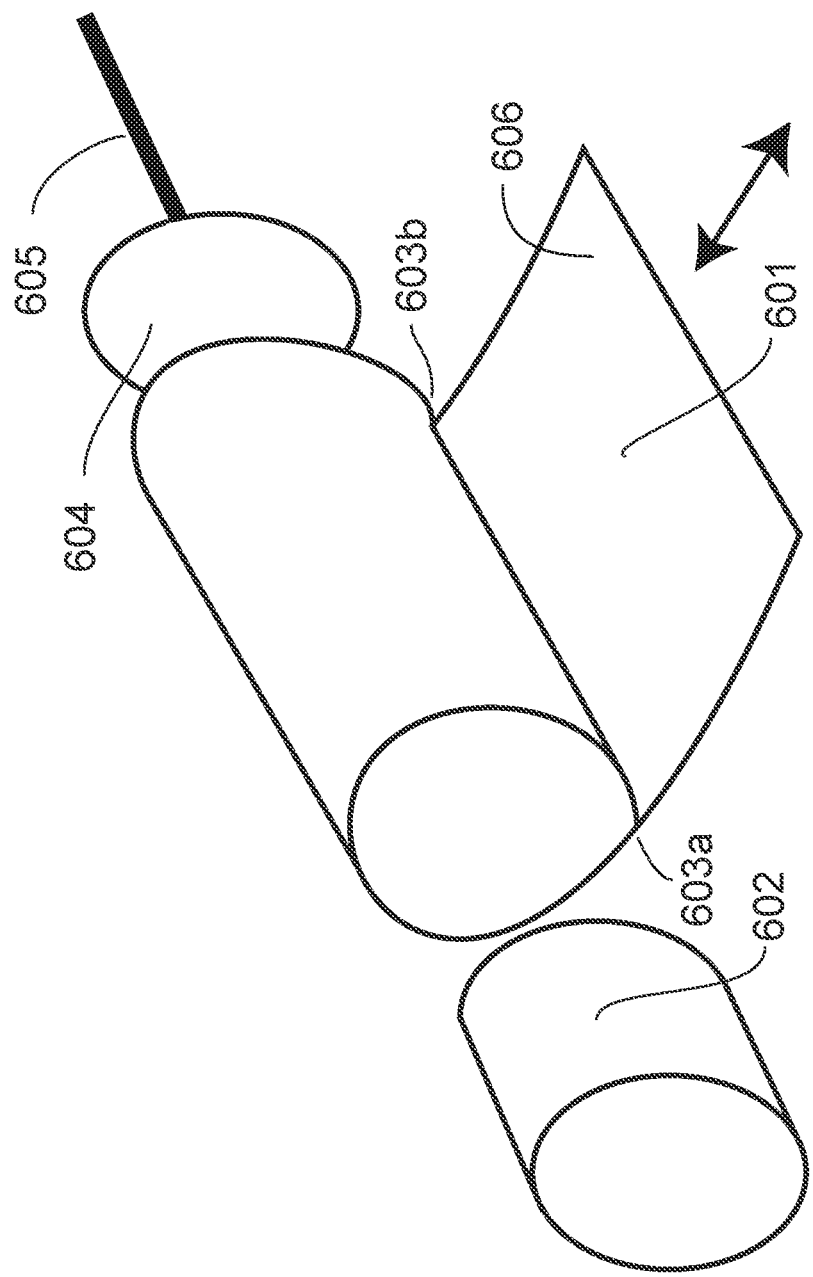
FIG. 6A is perspective view of an apparatus for applying radial compression on foam in accordance with another embodiment.
Figure 6B:
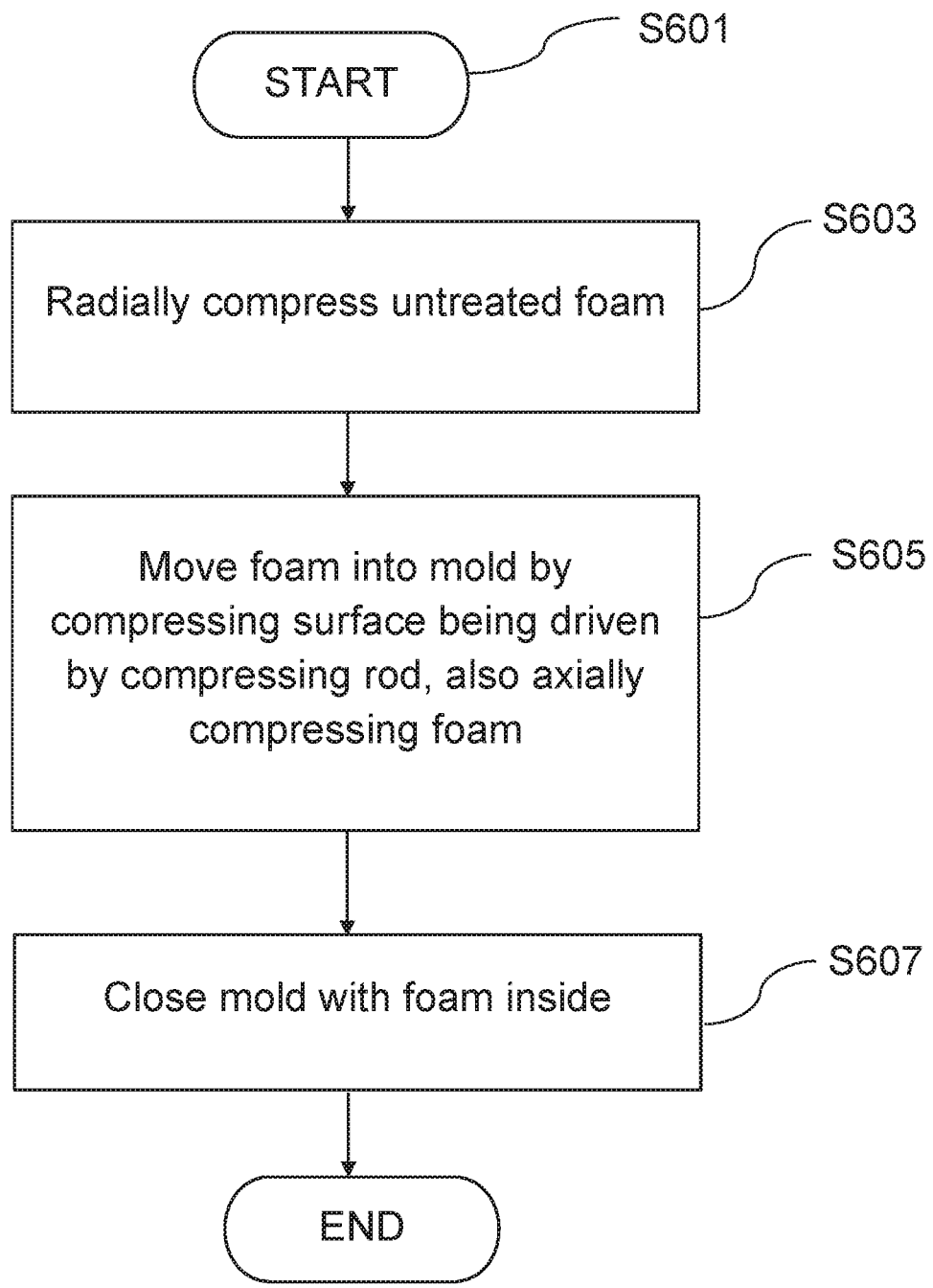
FIG. 6B is a diagram showing steps of a method in accordance with another embodiment.

Referring now to FIGS. 6A and 6B, in still another embodiment, an apparatus 60 and a method 60A are provided to compress foam into a cylindrical shape, specifically to radially compress an untreated cylindrical piece of foam, to axially compress the foam, and to move the foam into a cavity of a mold 602. In FIG. 6A, a flexible sheet 601 is held stationary along a first end between two points 603a and 603b. A second end 606 of the flexible sheet 601 is wrapped around a cylindrical piece of foam and put in tension to radially compress the foam. Once the foam is compressed radially at step S603, a compressing surface 604, driven by a compressing rod 605, moves the foam into the mold 602 and axially compresses the foam in the process at step S605. At step S607, the open end of the mold 602 is then closed with a cap or the like and the mold 602 can then be removed and replaced with an empty mold. The flexible sheet 601 may be made out of any strong, flexible material, such as ultra-high molecular weight polyethylene (UHMWPE), e.g., Dyneema®. In some embodiments, the mold 602 is made out of a rigid material. In other embodiments, the mold 602 is made out of a strong, flexible material.

In some embodiments, the cylindrical piece of foam has a circular cross-section. In other embodiments, the cylindrical piece of foam has a non-circular cross section. In still other embodiments, in place of a cylindrical piece of foam, a quantity of foam having a non-cylindrical shape is used.

In various embodiments, methods and apparatuses including but not limited to those illustrated in FIGS. 1 through 6, are combined with a conventional foam production process and apparatus. For example, in some embodiments, a continuous cylindrical flow of undifferentiated conventional polymer foam is extruded or otherwise emitted from an apparatus continuously producing such foam. As the bulk foam flows out, an adjoining apparatus cuts predetermined amounts of foam from the bulk flow of foam. Each such predetermined amount is then compressed and transferred into a rigid mold by one or more apparatuses or methods of the present disclosure. In still other embodiments, the compressing and transferring steps are performed on the bulk foam flow itself, beginning even before the predetermined amount of foam has been separated from the bulk foam flow. Advantageously, the time, effort, energy, and material required to convert conventional foam to auxetic foam may be reduced. In addition, large quantities of auxetic foam may be produced while maintaining fine control over the foam's final properties and with only minimal modification and re-tooling of conventional foam continuous bulk production processes.

Figure 7A:
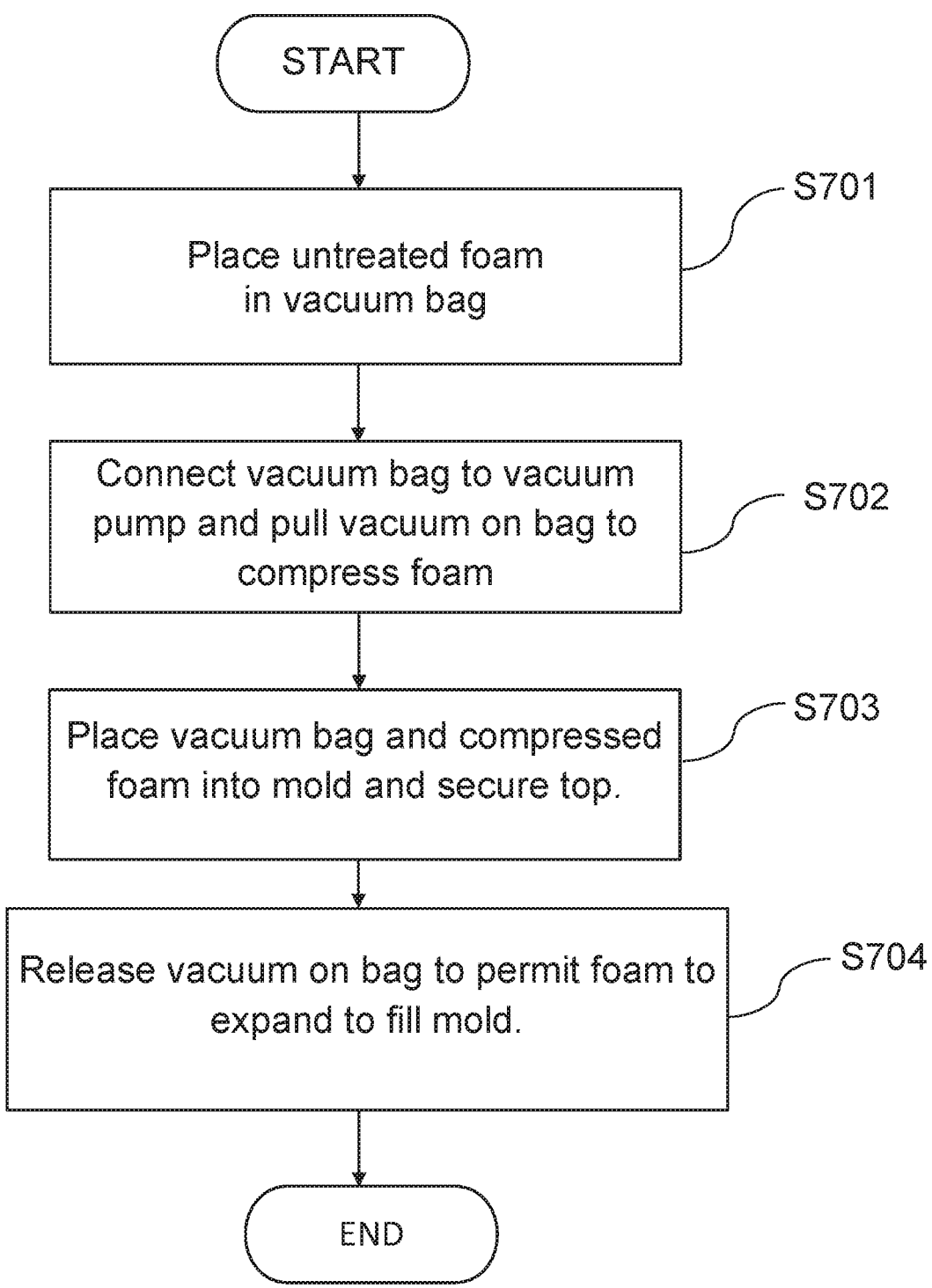
FIG. 7A is a diagram showing steps of a method in accordance with another embodiment.
Figure 7B:
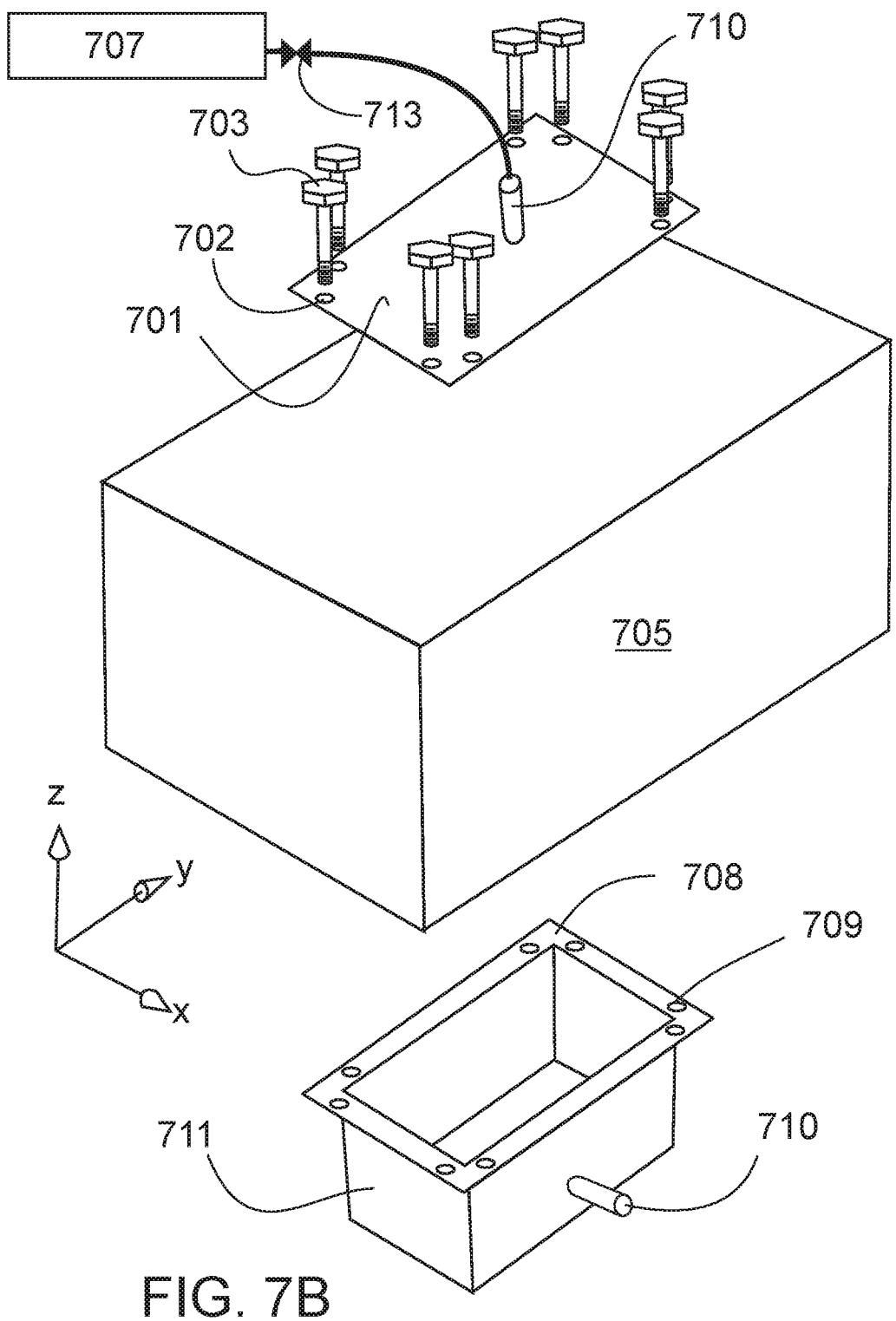
FIG. 7B is a perspective view of an apparatus in accordance with another embodiment.
Figure 7C:
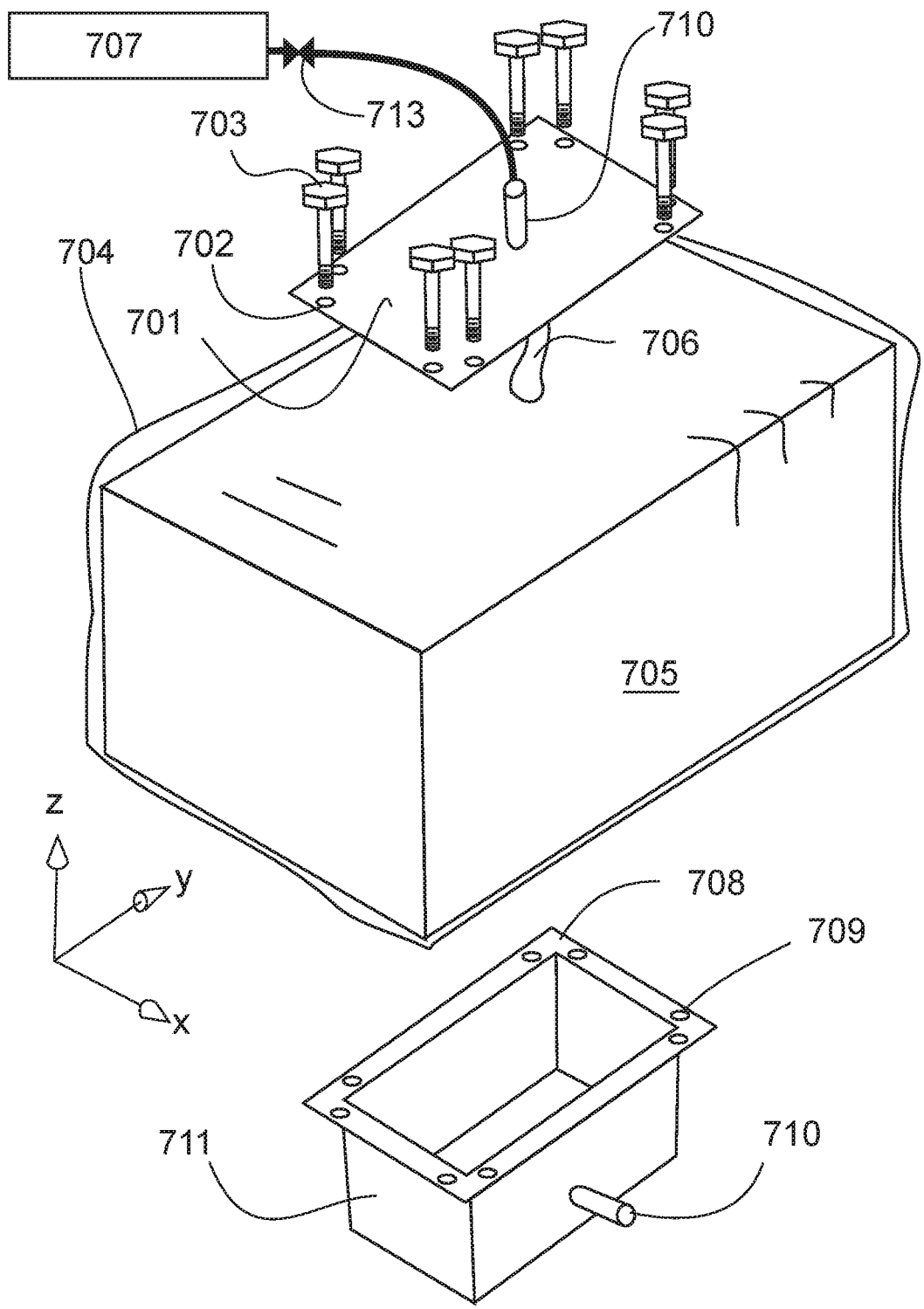
FIG. 7C is a perspective view of an apparatus in accordance with another embodiment utilizing a vacuum bag.
Figure 7D:
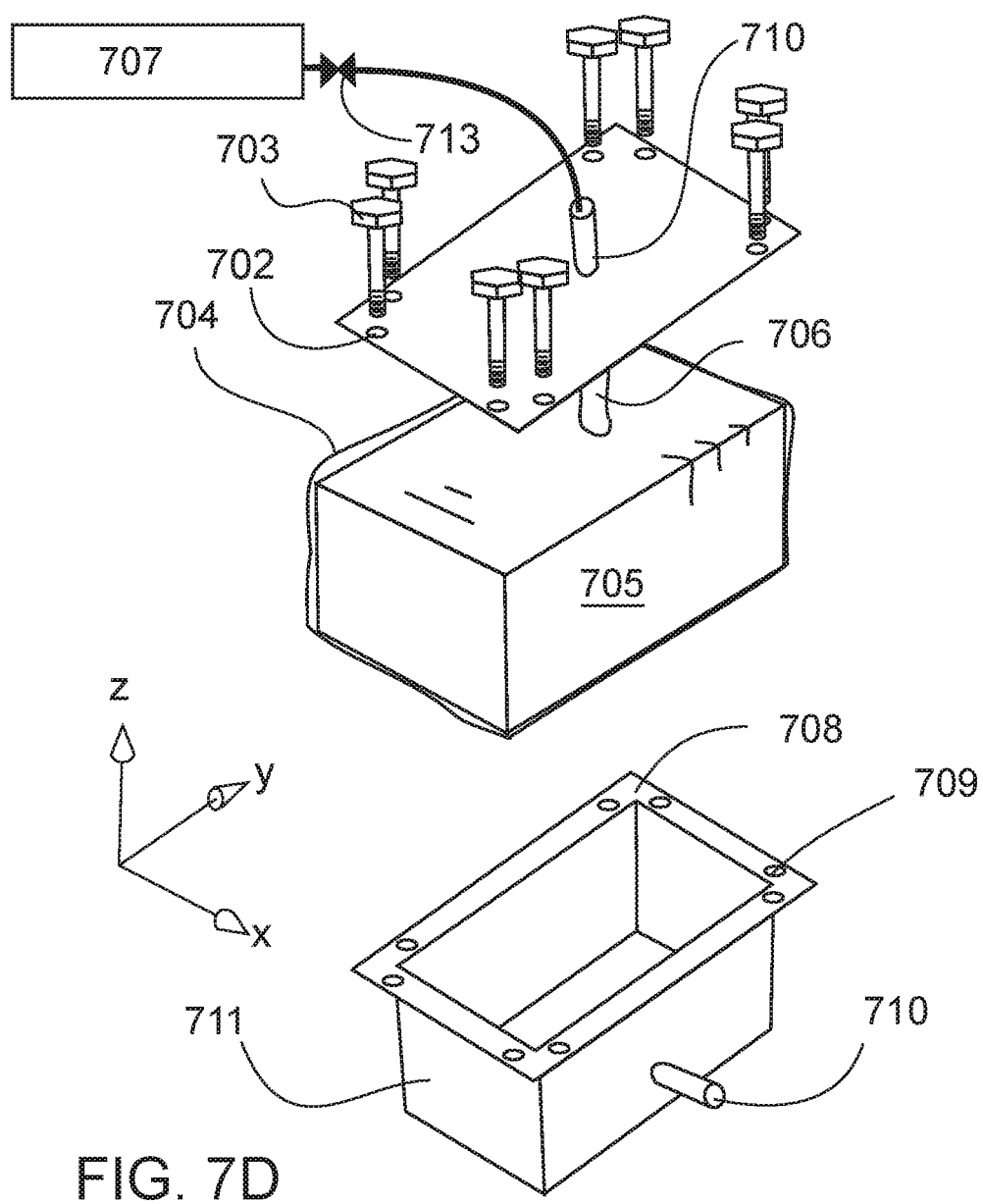
FIG. 7D is a further perspective view of the apparatus of FIG. 7C.

Referring now to FIGS. 7A through 7E, in still another embodiment, an untreated foam block 705 has an initial shape and size exceeding the dimensions of an interior space of a mold base 711 as shown in FIG. 7B. The foam block 705 is placed in a vacuum bag 704 at step S701, as shown in FIG. 7C. Note that other items may be placed in the vacuum bag 704 along with the untreated foam block 705, such as breather pads to help air escape from the bag 704 while the air is being pumped out of the bag 704. At step S702, the vacuum bag 704 is connected to a vacuum pump 707 and a vacuum is pulled on the vacuum bag 704 to compress the foam 705. Referring to FIG. 7D, as the air is removed from the vacuum bag 704, the foam 705 inside the vacuum bag 704 becomes compressed and thus smaller in size. In various embodiments, the forces that can be achieved with the vacuum bag 704 are about one ton per square foot. In some embodiments, a force of the vacuum bag 704 on the foam 705 is less than one ton per square foot. In other embodiments, the force of the vacuum bag 704 on the foam is greater than one ton per square foot. As such, sufficient force can be applied in order to achieve a desired compression of a wide variety of foams.

In various embodiments, the vacuum bag 704 may be formed from various materials or combinations of materials including polymer, textile, and the like.

Figure 7E:
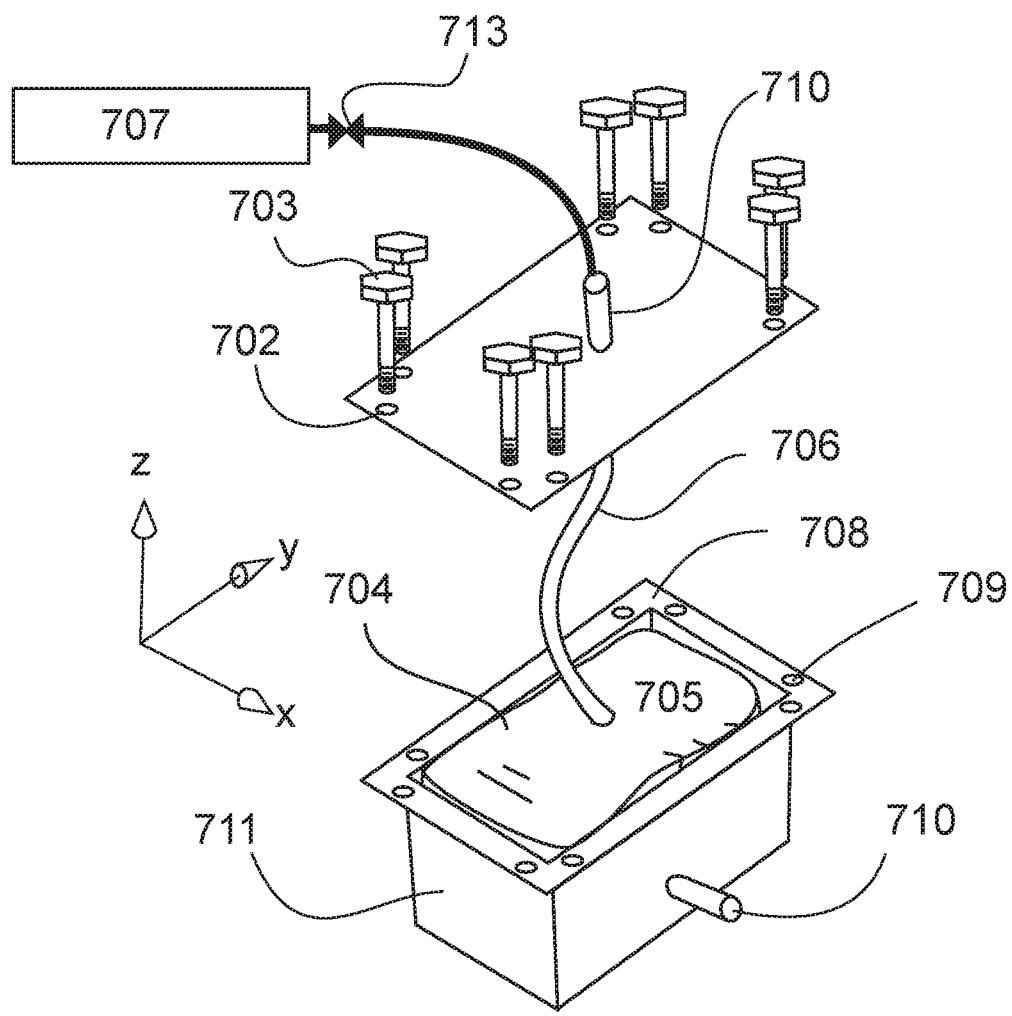
FIG. 7E is a further perspective view of the apparatus of FIG. 7D.

Referring to FIG. 7E, once a vacuum has been pulled on the vacuum bag 704 to compress the foam block 705, the foam block 705 is then placed in the mold base 711. Note that the untreated foam block 705 has an initial size and shape (FIG. 7B) such that once compressed (7E), it can be placed into the mold 711 easily. At step S703, the vacuum bag 704 and the foam 705, contained in the vacuum bag 704, are both placed into the mold 711 and a top 701 is secured onto the mold base 711.

At step S704, with the foam 705 now secured inside the mold 701, 711, the vacuum on the bag 704 is released to permit the foam 705 to expand to fill the mold base 711. In some embodiments, the vacuum bag 704 has a valve 713 or a sealing mechanism and a coupling to a vacuum pump 707 by which the air is evacuated. In an embodiment, the coupling mechanism includes a hose 706.

In some embodiments, one or more surfaces of the mold 711 have an opening 710 so that the valve 713 and a coupling including the hose 706 can be outside the mold body 711. Once the foam 705 and the vacuum bag 704 are in the mold body 711, the mold cover 701 is placed on the mold body 711. In the embodiment shown in FIGS. 7B through 7E, a mating flange 708 is used with bolts 703 passing through holes 702 and into threaded holes 709 to secure the mold top 701 to the mold body 711. In other embodiments, other fastening devices are used, including, but not limited to one or more clips, clamps, latches, or straps.

Once the mold including the mold cover 701 and the mold body 711 is closed, the valve 713 on the vacuum bag 704 is opened to allow air to enter the vacuum bag 704. As air enters the vacuum bag 704, the foam 705 is allowed to expand to fill the mold including the space bounded by the mold cover 701 and the mold body 711. In some embodiments, it has been found helpful to temporarily pressurize the vacuum bag 704 enclosed inside the mold including the mold cover 701 and the mold body 711 to a pressure Pexc in excess of an atmospheric pressure Patm. Doing so may aid in allowing the foam 705 to more completely fill the space enclosed by the mold cover 701 and the mold body 711. Accordingly, methods in accordance with some embodiments include pressurizing the vacuum bag 704 to a pressure Pexc in excess of an atmospheric pressure Patm and then releasing the pressurized air from the vacuum bag 704 to permit the vacuum bag 704 to vent back to atmospheric pressure. In other embodiments, these pressurizing and releasing steps are omitted.

In still other embodiments, after the compression, the vacuum bag 704 is sealed. The sealed vacuum bag 704, enclosing the compressed foam block 705, is then enclosed in the mold base 711 with the mold cover 701 and without the coupling or hose 706 extending through the mold base 711. In such cases, rather than the valve 713, a device is provided to puncture, cut, or in some other way open the vacuum bag 704 once enclosed inside the mold base 711. In some embodiments, vacuum bag 704 enclosing the foam 705 inside mold base 711 is accessed through the one or more openings 710 to be punctured, cut, or otherwise opened.

The above discusses various embodiments with respect to a discrete foam blank. However, embodiments are not limited to the conversion of discrete bodies or blanks of foam. Instead, compressing, enclosing, and treating steps in accordance with various embodiments may be performed on only one portion of a foam body while one or more such steps is not performed on a contiguous portion of the same foam body. Also, multiple portions or pieces of foam or discrete foam blanks may be placed in a single vacuum bag for processing.

The methods and apparatuses disclosed are not limited to the production of auxetic foams only. Rather, in accordance with various embodiments, the Poisson's ratio of a material can be precisely controlled to fall anywhere in a range including positive values, zero, and negative values. Moreover, while in some embodiments, foam bodies are formed having uniform properties throughout, in other embodiments, foam bodies are deliberately formed having non-uniform properties throughout.

Conventional polymer and/or rubber-based foams are often produced to have uniform properties including a set density and a positive Poisson's ratio. As discussed herein, conventional foams can be further processed to create foams having negative Poisson's ratios. In embodiments, reducing a foam's Poisson's ratio also has the effect of increasing the foam's equilibrium density. In accordance with some embodiments, the processes used to create auxetic foams can be controlled so as to vary the density and Poisson's ratio continuously. Any density equal to or greater than the initial density can be achieved. Likewise, any Poisson's ratio from the initial value to a negative value may be achieved. Further, such process control provides a means for varying physical properties within a single piece of foam. Some embodiments in accordance with the present disclosure provide mechanisms, apparatuses, and methods to produce a single piece of foam with differing physical properties throughout.

In the processes that are used to convert normal foam into auxetic foam, the untreated foam is tri-axially compressed and then thermal, chemical or thermal and chemical processes are used to convert the foam. It has been found that by controlling the tri-axial pressure that is applied to the foam that a continuous variation in physical properties can be achieved. In some embodiments, a small force applied to a foam sample during the conversion process will produce a proportional change in the physical properties of the foam, the density of the foam will increase and the Poisson's ratio will decrease. Poisson's ratios can be reduced to negative values, but can also be reduced only so much that they remain positive, or are zero. As the forces are increased on the foam sample, the greater the change in physical properties of the treated sample.

It has also been found that if different parts of an untreated foam block are subjected to different forces, the variation in force only occurs per physical location and is not changing over time during the conversion process. Accordingly, a block of foam can be produced to have heterogeneous physical properties. These variations in physical properties can be designed to provide better physical support. As a non-limiting example, in some embodiments, the properties of the foam is engineered to better support the human back in a seat. In other embodiments, the properties of the foam are engineered to better support a human foot. In other embodiments, the foam's properties are engineered to improve the comfort level of prosthetic devices. In still other embodiments, the properties of the foam are engineered to better protect a human head from impacts. These examples in no way are meant to limit the scope of the disclosure, as there are many useful applications wherein varying physical properties of the foam is beneficial.

It should also be noted that once a block of foam is constrained in a mold or reaction vessel, the addition of force on any portion of any one or more sides will produce an increase in the tri-axial forces in the localized region around the area the additional force is being applied. Thus, it is possible to vary the physical properties over any plane and in any direction throughout a block of foam.

Figure 8:
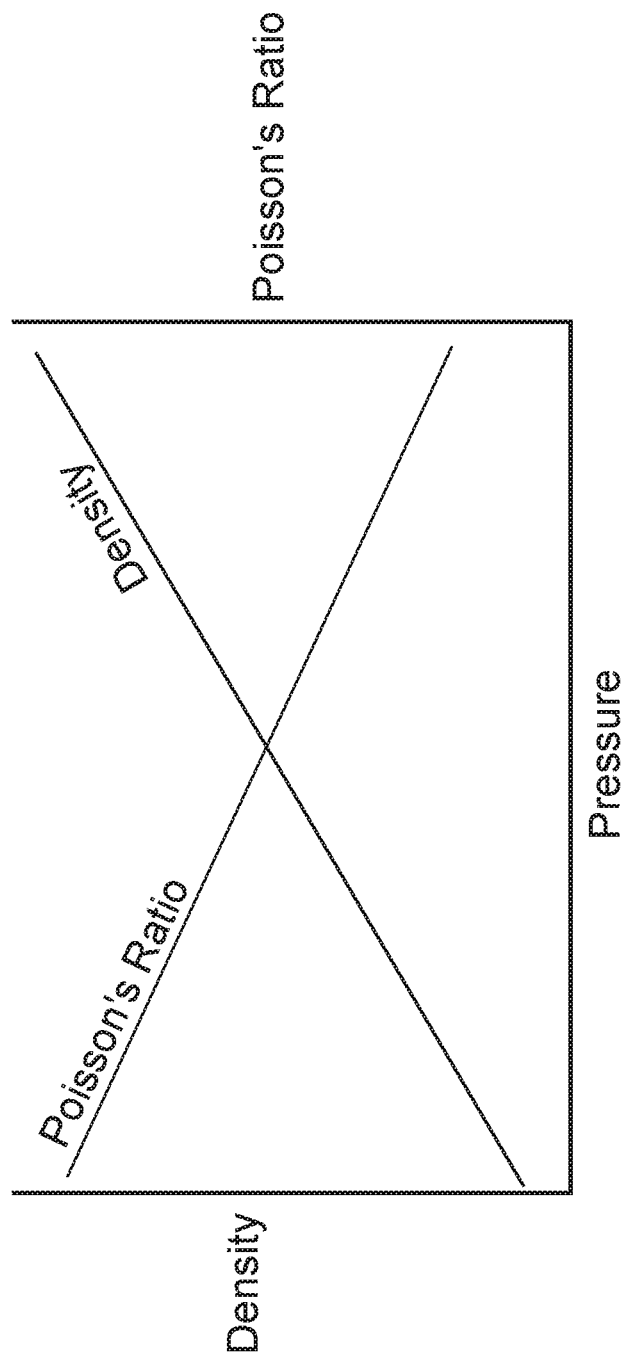
FIG. 8 is a diagram showing an effect of tri-axial pressure applied during treatment on physical properties of a treated foam.

Referring now to FIG. 8, given a tri-axial force (shown on the bottom axis) applied to a volume of foam, the resulting physical properties of Density (scale on left axis) and Poisson's Ratio (scale on right axis) are shown. Such a chart can be created for any foam and process to predict the physical properties that will be created under any processing condition. In general, the relationships are such that an increased pressure applied results in finished foam having a lower Poisson's Ratio and a greater equilibrium density. In various embodiments, the slope (rate of change) in Poisson's Ratio and Density for a given change in Pressure may differ for different materials, different temperatures, and different chemical treatments. In some embodiments, and within some Pressure ranges, Poisson's ratio has a substantially linear correlation to Pressure. In other embodiments, and within other Pressure ranges, Poisson's ratio has a substantially non-linear correlation to Pressure. In some embodiments, and within some Pressure ranges, Density has a substantially linear correlation to Pressure. In other embodiments, and within other Pressure ranges, Density has a substantially non-linear correlation to Pressure. Advantageously, it has been found that by processes and apparatuses in accordance with embodiments disclosed, variations in the pressures applied at different times to different portions of a quantity of foam being compressed and treated are reduced. This has improved the reliability of models used to predict and control the final mechanical properties of treated foams. Quality has thus been improved, along with efficiency and scalability.

Figure 9B:
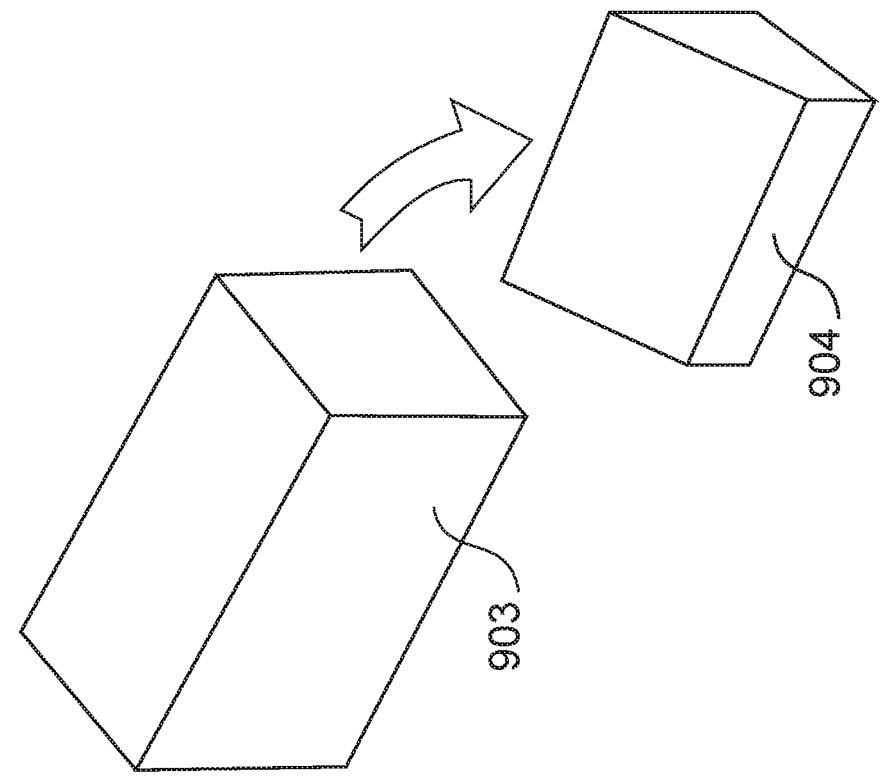
FIG. 9B is a perspective view of another foam before and after treatment by an apparatus and method to produce foam having varying physical properties in accordance with another embodiment.
Figure 9A:
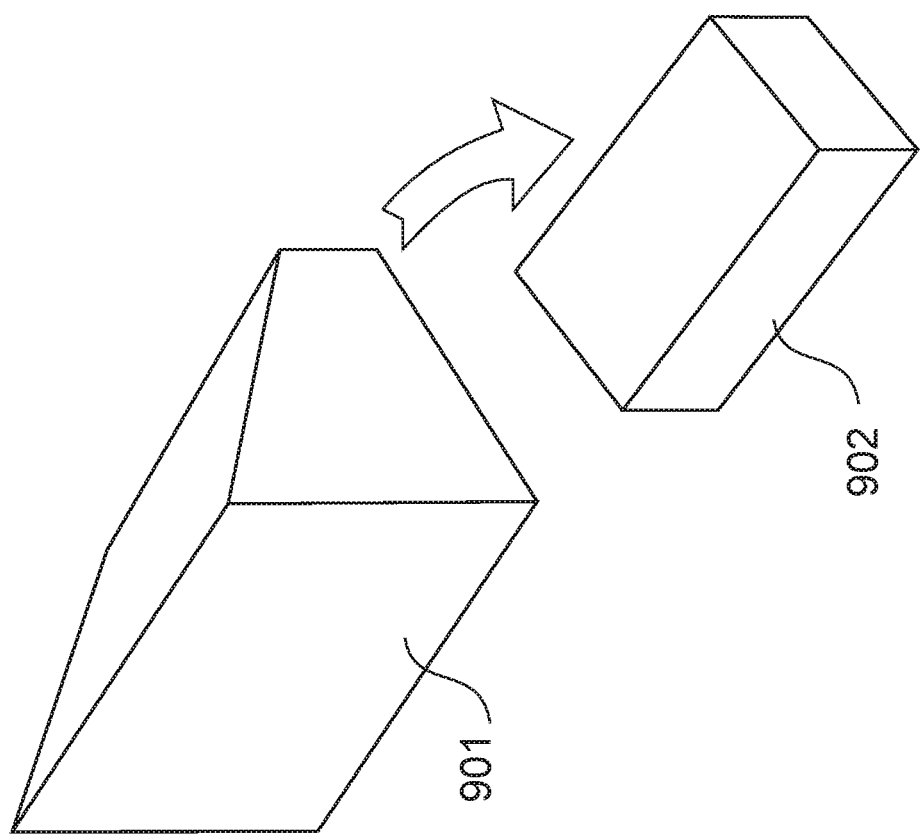
FIG. 9A is a perspective view of a foam before and after treatment by an apparatus and method to produce foam having varying physical properties in accordance with another embodiment.

Referring now to FIG. 9A, a foam block 901 is shown that when placed in a mold 902 will cause a variation in the forces on the foam—high forces on the front edge of the foam and low forces on a back edge of the foam. Once treated, the foam block 901 will come out as a rectangular prism but having higher density and lower Poisson's Ratio on the leading edge of the foam block and as one moves back from the leading edge, the density of the foam decreases and the foam's Poisson's ratio is closer and closer to that of the initial untreated foam.

Referring now to FIG. 9B, a foam block 903 is shown that can be placed into a mold 904 that produces the same variation in tri-axial force and thus the same physical properties as FIG. 9A.

Figure 10:
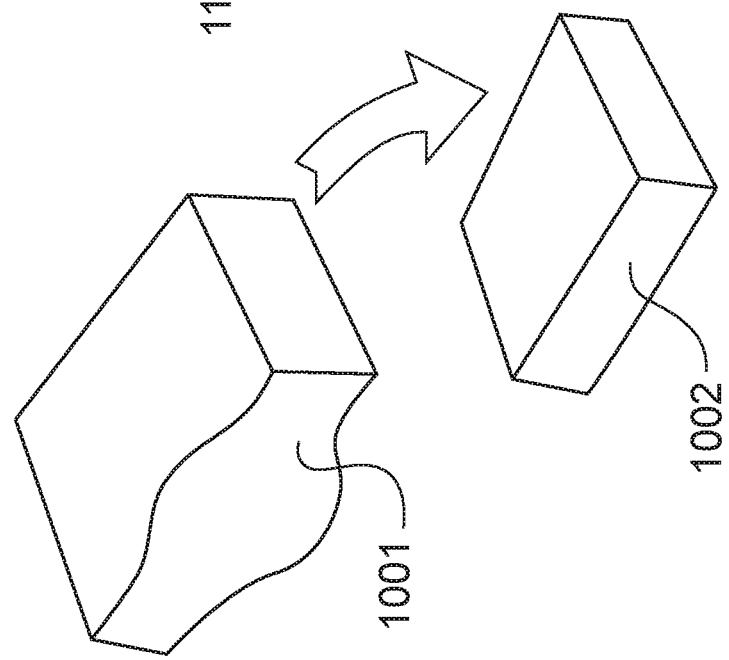
FIG. 10 is a perspective view of another foam before and after treatment by an apparatus and method to produce foam having varying physical properties in accordance with still another embodiment.

Referring now to FIG. 10, a foam block 1001 that has a complex shape or irregular shape, that when placed into a mold 1002 will produce a more complex force distribution and thus a foam with corresponding variations in physical properties.

Figure 11:
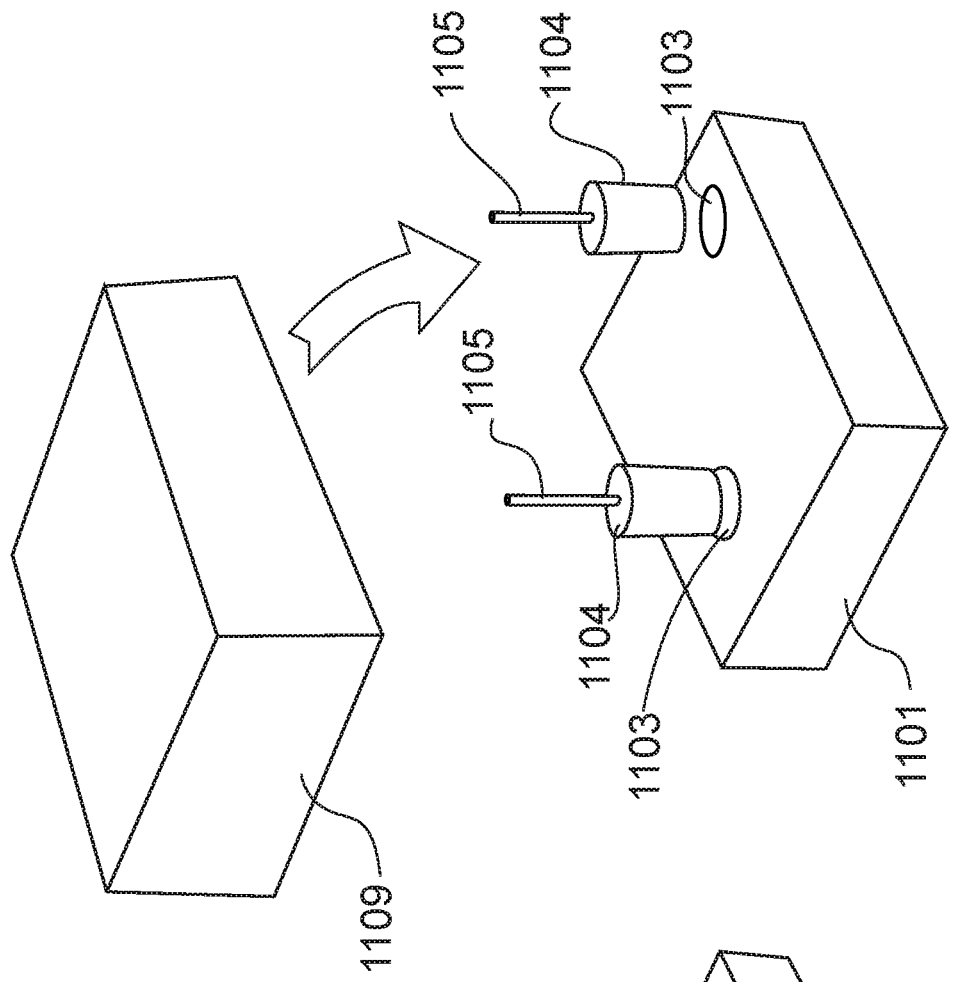
FIG. 11 is a perspective view of another foam before and after treatment by an apparatus and method to produce foam having varying physical properties in accordance with yet another embodiment.

Referring now to FIG. 11, in a process and apparatus in accordance with an embodiment, a foam block 1109 is initially uniformly tri-axially compressed into a mold 1101. There are openings 1103 in the mold 1101 that allow plungers 1104 to be driven into the foam block to increase the applied forces in the regions corresponding to the openings 1103 and in the shape of each of the plungers 1104. The plungers 1104 are driven by one or more driving devices 1105. The driving devices 1105 include, but are not limited to, piston-cylinder devices, rotating cams, geared drive trains, and the like.

Figure 12:
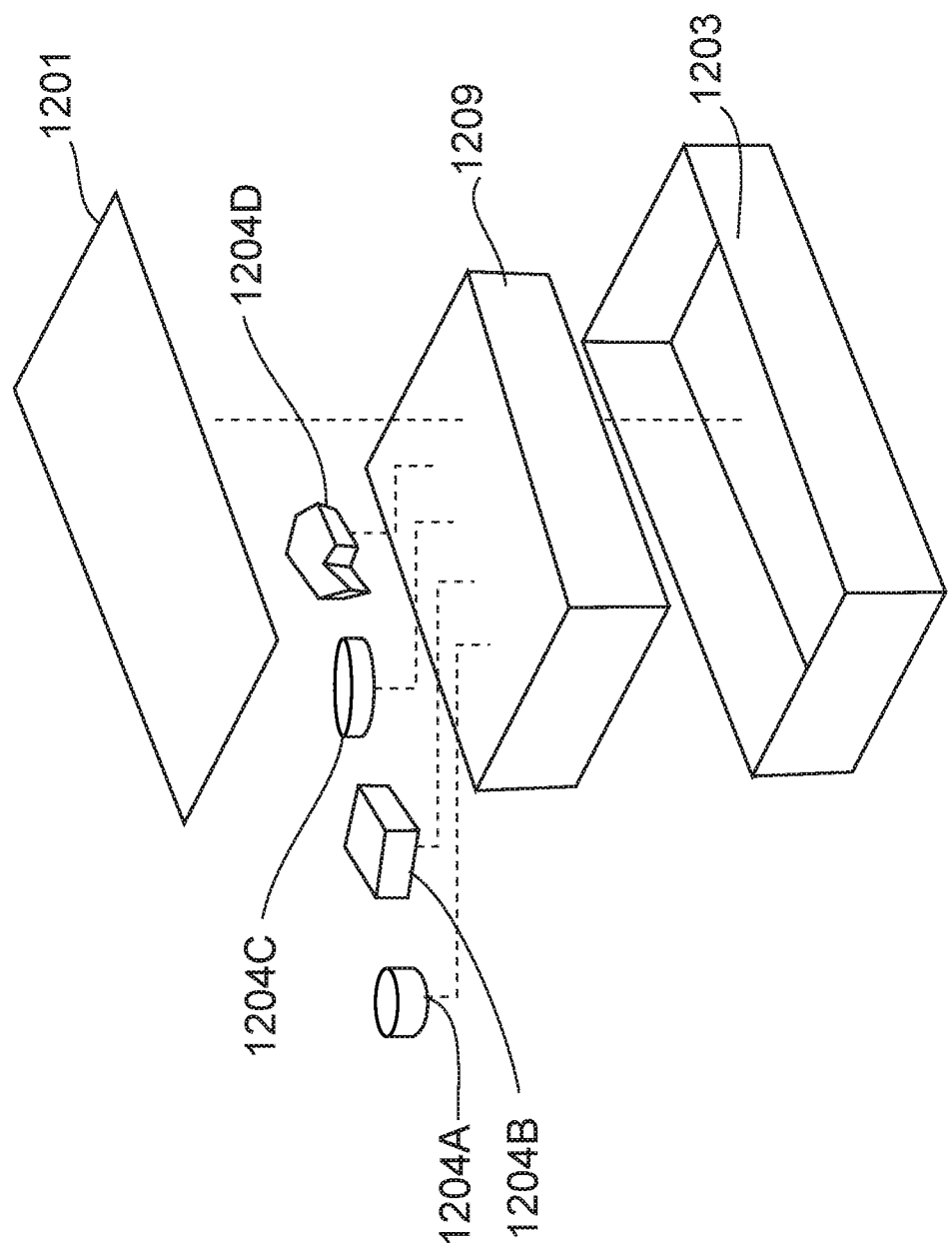
FIG. 12 is perspective view of an apparatus in accordance with another embodiment to produce foam having varying physical properties in accordance with another embodiment.

Referring now to FIG. 12, a foam block 1209 is placed into a mold 1203 with a mold lid 1201. One or more shape items 1204A, 1204B, 1204C, 1204D are placed into the mold 1203 with the foam block 1202 under the lid 1201. This causes an increase in the tri-axial forces on the foam in the areas near where the shape items 1204A, 1204B, 1204C, 1204D are placed, causing a change in the physical properties of the foam 1209 in these areas. Various other shapes, sizes and tri-axial force locations for the foam are possible and within the scope of this disclosure.

Figure 13:
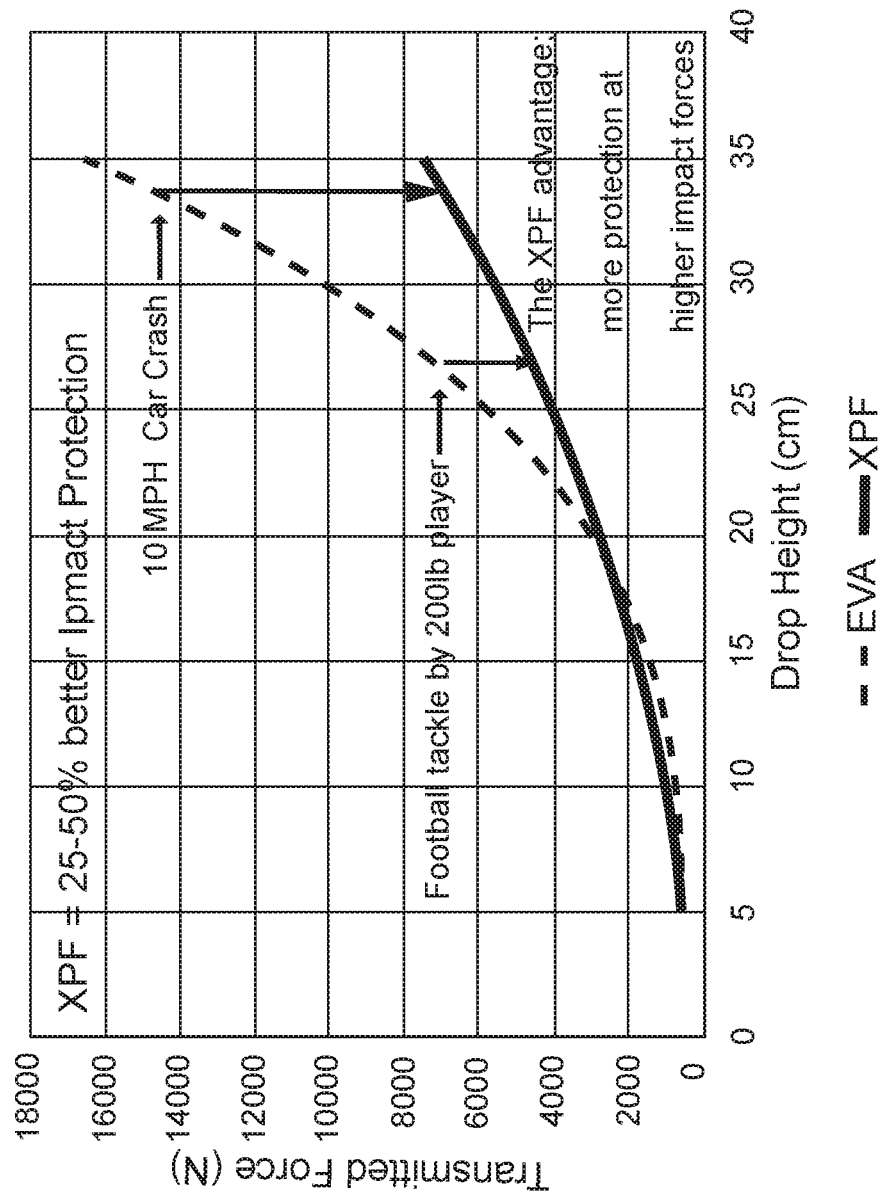
FIG. 13 compares impact drop test results from a conventional EVA (ethylene-vinyl acetate) foam and from an auxetic foam, labeled XPF.
Figure 14:
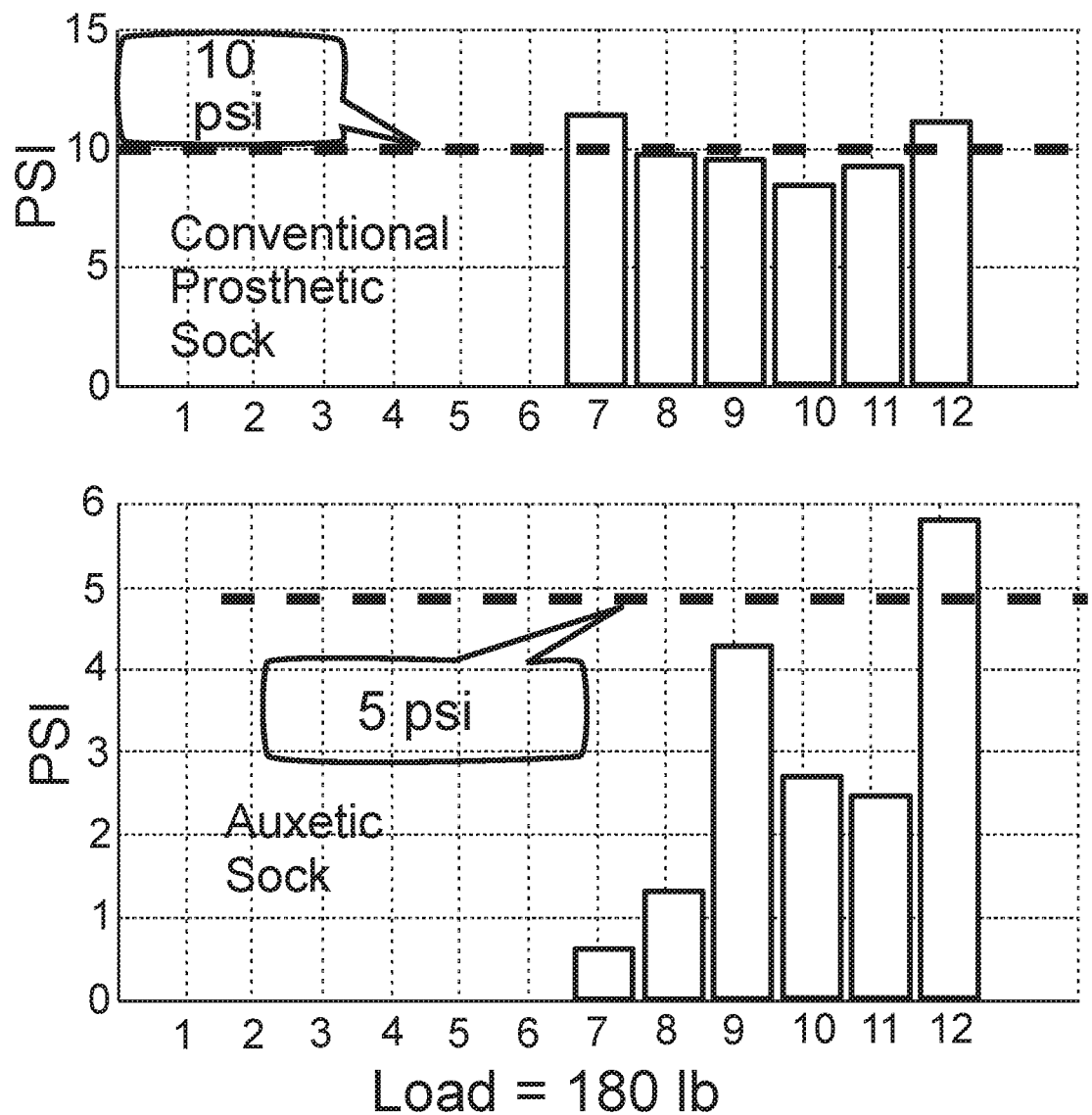
FIG. 14 compares pressure under comparable loads for a conventional prosthetic sock and for an auxetic sock.

Advantageously, in various embodiments, a foam is produced having auxetic properties not only in tension, but also in compression. FIGS. 13 and 14 show some of the advantageous results that may be realized from use of the methods and apparatuses described.

Some embodiments include a method of processing a quantity of foam having a first initial thickness along a first axis, a second initial thickness along a second axis, and a third initial thickness along a third axis, the method comprising: applying at least one of a first force in the first axis to compress the quantity of foam to a first compressed thickness in the first axis, a second force in the second axis to compress the quantity of foam to a second compressed thickness in the second axis, and a third force in the third axis to compress the quantity of foam to a third compressed thickness in the third axis; and enclosing the quantity of foam in a rigid mold to limit expansion of the foam to at least one of a first molded thickness less than the first initial thickness in the first axis, a second molded thickness less than the second initial thickness in the second axis, and a third molded thickness less than the third initial thickness in the third axis.

Some embodiments further include with the quantity of foam enclosed in the rigid mold, subjecting the enclosed quantity of foam to at least one of a chemical treatment and a thermal treatment to convert the quantity of foam to an auxetic foam having at least one of a first treated thickness less than the first initial thickness in the first axis, a second treated thickness less than the second initial thickness in the second axis, and a third treated thickness less than the third initial thickness in the third axis.

In other embodiments, at least one of the applying the first force, the applying the second force, and the applying the third force further includes: compressing the quantity of foam against an interior surface of the mold.

In still other embodiments, at least one of the following conditions is met: the first compressed thickness is less than or equal to the first molded thickness, the second compressed thickness is less than or equal to the second molded thickness, and the third compressed thickness is less than or equal to the third molded thickness. In further embodiments, at least one of the following conditions is met: the first compressed thickness is from 0.1% to 20% smaller than the first molded thickness; the second compressed thickness is from 0.1% to 20% smaller than the second molded thickness; and the third compressed thickness is from 0.1% to 20% smaller than the third molded thickness.

In some embodiments, at least one of the applying the first force, the applying the second force, and the applying the third force further includes: displacing the quantity of foam to pass from a first position outside a cavity of the mold to a second position inside the cavity of the mold through an opening in the mold. Some embodiments further include closing the opening in the mold. Some embodiments further include removing the closed mold from the compression apparatus. Some embodiments further include replacing the closed mold with an empty mold different from the closed mold. In some embodiments, the displacing the quantity of foam is concurrent at least in part with at least one of the applying the first force, the applying the second force, and the applying the third force. In some embodiments, the displacing the quantity of foam and at least one of the applying the first force, the applying the second force, and the applying the third force are by a continuous application of a pressure on a surface of the quantity of foam. In some embodiments, the applying the first force precedes the applying the second force. In some embodiments, the applying the first force is concurrent at least in part with the applying the second force.

In some embodiments, at least one of the applying the first force, the applying the second force, and the applying the third force further comprises: adjusting a flexible sheet wrapped about the quantity of foam to limit a radial dimension of a space circumscribed by the flexible sheet. In some further embodiments, a first end of the flexible sheet is fixed along an axial direction and the adjusting the flexible sheet further comprises: tensioning a second end of the sheet opposite the first end to induce an angular displacement of the sheet circumferential to the quantity of foam.

In some embodiments, the quantity of foam has an initial shape of a polyhedron. In some embodiments, the quantity of foam has an initial shape of a cylinder. Some embodiments further comprise injecting a compressed gas to reduce friction on at least one surface of the quantity of foam. In some embodiments, the compressed gas is air.

Some embodiments further comprise providing a lubricant to reduce friction on at least one surface of the quantity of foam. Some embodiments further comprise providing a sliding guide to reduce friction on at least one surface of the quantity of foam. Some embodiments further comprise inserting the sliding guide with the foam into the mold. Some embodiments further comprise removing the sliding guide from the mold by passing the sliding guide through an opening in the mold while retaining the foam inside the mold.

Embodiments include an apparatus for compressing and enclosing a quantity of foam in a controlled manner in a mold, the apparatus comprising: first opposing compression surfaces spaced apart in a first axis, at least one of the first opposing compression surfaces being movable along the first axis; second opposing compression surfaces spaced apart in a second axis, at least one of the second opposing compression surfaces being movable along the second axis; third opposing compression surfaces spaced apart in a third axis, at least one of the third opposing compression surfaces being movable along the third axis; at least one surface from among the first opposing compression surfaces, the second opposing compression surfaces, and the third opposing compression surfaces forming at least a portion of an interior surface of the mold.

In some embodiments, at least one surface from among the first opposing compression surfaces, the second opposing compression surfaces, and the third opposing compression surfaces includes at least one hole to permit a compressed gas to flow into a space adjacent to the at least one surface.

Some embodiments further comprise at least one sliding guide to abut at least one surface from among the first opposing compression surfaces, the second opposing compression surfaces, and the third opposing compression surfaces. In some embodiments, the at least one sliding guide includes at least one hole to permit a compressed gas to flow from one side of the sliding guide to another.

In some embodiments, at least one surface from among the first opposing compression surfaces, the second opposing compression surfaces, and the third opposing compression surfaces has a coefficient of static friction with the foam equal to or less than 0.25.

Embodiments include an apparatus for compressing and enclosing a quantity of compressed foam, the apparatus comprising: a compression mechanism including first opposing compression surfaces spaced apart in the first axis, at least one of the first opposing compression surfaces being movable along the first axis, second opposing compression surfaces spaced apart in a second axis, at least one of the second opposing compression surfaces being movable along the second axis, and third opposing compression surfaces spaced apart in a third axis, at least one of the third opposing compression surfaces being movable along the third axis; a rigid mold including a first mold plate having a first mold surface, a second mold plate having a second mold surface spaced apart from the first mold surface in the first axis, the first and second mold plates being removably arranged between the first opposing compression surfaces, a third mold plate having a third mold surface, a fourth mold plate having a fourth mold surface spaced apart from the third mold surface in the second axis, the third and fourth mold plates being removably arranged between the second opposing compression surfaces, a fifth mold plate having a fifth mold surface, and a sixth mold plate having a sixth mold surface spaced apart from the fifth mold surface in the third axis, the fifth and sixth mold plates being removably arranged between the third opposing compression surfaces; a first driving mechanism to drive the first opposing compression plates toward one another in the first axis; a second driving mechanism to drive the second opposing compression plates toward one another in the second axis; a third driving mechanism to drive the third opposing compression plates toward one another in the third axis; one or more fastening devices to fix the third mold plate, the fourth mold plate, the fifth mold plate, and the sixth mold plate in relation to the first mold plate and the second mold plate so as to rigidly enclose a mold cavity bounded by the first mold surface, the second mold surface, the third mold surface, the fourth mold surface, the fifth mold surface, and the sixth mold surface.

Embodiments include a method to modify a density and Poisson's ratio of a foam, the process comprising: tri-axially compressing the foam to a predetermined density; and processing the foam by at least one of a thermal process and a chemical treatment process, thereby causing the foam to retain the density imparted by the compressing.

In some embodiments, the compressing is uniform, so as to produce a uniformly higher density and lower Poisson's ratio. In some embodiments, the compressing is non-uniform, so as to produce predetermined density variations and Poisson's ratio variations in the foam. In some embodiments, the compressing further includes applying non-uniform forces by a non-uniform shape of a mold. In some embodiments, the compressing further includes applying non-uniform forces by an apparatus having a first force-application device to apply a first force to the foam and a second force-application device to apply a second force to the foam, the second force having a different magnitude from the first force.

In some embodiments, the compressing further includes applying non-uniform forces by the foam having a non-uniform initial shape, such that when placed into a mold having a uniform shape, the foam experiences non-uniform forces on one or more surfaces of the foam. In some embodiments, the compressing further includes applying non-uniform forces by introducing one or more templates having a predetermined shape between the foam and the mold, the one or more templates remaining throughout the processing the foam. Some embodiments comprise further compressing the foam at one or more discrete portions of one or more surfaces of the foam beyond the tri-axial compressing.

Embodiments include a method of processing a cylindrical quantity of foam having an initial radial thickness in a radial direction and a second initial axial thickness, the method comprising: applying a first force to a flexible sheet circumscribing the cylindrical foam to compress the quantity of cylindrical foam to a compressed radial thickness; providing a rigid mold adjacent to a proximal end of the quantity of cylindrical foam, an inner radial dimension of the mold being greater than or equal to the compressed radial thickness; applying a second force on a distal end of the of the cylindrical quantity of foam to displace the foam toward the rigid mold and to compress the cylindrical quantity of foam against the rigid mold; and closing the rigid mold with the compressed cylindrical quantity of foam enclosed inside the rigid mold. In some embodiments, the cylindrical quantity of foam has a circular cross-section. In some embodiments, the cylindrical quantity of foam has a non-circular cross-section.

Embodiments include an apparatus for compressing and securely enclosing a quantity of foam in three dimensions. The apparatus comprises a mold, a first compressing means, a first securing means, a second compressing means, a second securing means, a third compressing means, and a third securing means. The mold has a first pair of segments spaced apart in a first axis, a second pair of segments spaced apart in a second axis, and a third pair of segments spaced apart in a third axis. The first compressing means is for compressing the foam between the first pair of mold segments in the first axis. The first securing means is for securing the first pair of mold segments together after the foam is compressed between the first pair of mold segments and before the first pair of mold segments is removed from the first compressing means. The second compressing means is for compressing the foam between the second pair of mold segments in the second axis. The second securing means is for securing the second pair of mold segments together after the foam is compressed between the second pair of mold segments and before the second pair of mold segments is removed from the second compressing means. The third compressing means is for compressing the foam between the third pair of mold segments in the third axis. The third securing means is for securing the third pair of mold segments together after the foam is compressed between the third pair of mold segments and before the third pair of mold segments is removed from the third compressing means. The second securing means and the third securing means are insertable into the mold in a direction parallel to the first axis to secure the second and third pairs of mold segments after the foam has been compressed between the second and third pairs of mold segments.

The contemplated modifications and variations specifically mentioned above and below are considered to be within the spirit and scope of the present invention. Aspects of the invention discussed with respect to any one embodiment may be combined with other aspects of the invention discussed with respect to any other embodiments.

Those of ordinary skill in the art will recognize that various modifications and variations may be made to the embodiments described above without departing from the spirit and scope of the present invention. It is therefore to be understood that the present invention is not limited to the particular embodiments disclosed, but it is intended to cover such modifications and variations as defined by the following claims.

What is claimed is:

1. An apparatus to compress polymer foam in preparation to impart auxetic properties to the polymer foam by at least one of a chemical and thermal treatment, the apparatus comprising:
   a first pair of opposing compression surfaces, one of the first pair of opposing compression surfaces being movable in relation to a second compression surface of the first pair along a first axis between a first expanded position and a first compressed position;
   a mold having a pair of opposing first mold segments, each of the first mold segments having a mold surface, one of the first mold segments being movable in relation to a second mold segment of the first pair of mold segments along the first axis between a first open position in which the first mold surfaces are distant from one another and a first closed position in which the first mold surfaces are proximal to one another, wherein when the first pair of compression surfaces is in the first expanded position the first compression surfaces are spaced apart sufficiently to accommodate between the first pair of compression surfaces the first mold segments in the first open position, and the first pair of compression surfaces in moving from the first expanded position to the first compressed position apply a first compressive force to move the first mold segments into the first closed position, the first mold segments enclosing a mold cavity bounded by the first opposing mold surfaces; and a second pair of opposing compression surfaces, one of the second pair of opposing compression surfaces being movable in relation to a second compression surface of the second pair along a second axis between a second expanded position and a second compressed position, the mold having a pair of second opposing mold segments, each of the second mold segments having a mold surface, one of the second mold segments being movable in relation to a second mold segment of the pair of second mold segments along the second axis between a second open position in which the second mold surfaces are distant from one another and a second closed position in which the second mold surfaces are proximal to one another, wherein when the second pair of compression surfaces is in the second expanded position the second compression surfaces are spaced apart sufficiently to accommodate between the second compression surfaces the second mold segments in the second open position, and the second compression surfaces in moving from the second expanded position to the second compressed position apply a second compressive force to move the second mold segments into the second closed position, the mold cavity being bounded by the second opposing mold surfaces, a third pair of opposing compression surfaces, one of the third pair of opposing compression surfaces being movable in relation to a second compression surface of the third pair of opposing compression surfaces along a third axis between a third expanded position and a third compressed position, the mold having a pair of third opposing mold segments, each of the third mold segments having a mold surface, one of the third mold segments being movable in relation to a second mold segment of the third pair of mold segments along the third axis between a third open position in which the third mold surfaces are distant from one another and a third closed position in which the third mold surfaces are proximal to one another, wherein when the third pair of compression surfaces is in the third expanded position the third compression surfaces are spaced apart sufficiently to accommodate between the third pair of opposing compression surfaces the third mold segments in the third open position, and the third compression surfaces in moving from the third expanded position to the third compressed position apply a third compressive force to move the third mold segments into the third closed position, the mold cavity being bounded by the third opposing mold surfaces; and at least one fastener, wherein the at least one fastener holds the first mold segments in the first closed position separately from the first pair of opposing compression surfaces such that the mold remains in the first closed position when the first compressive force on the first mold segments is removed, wherein the at least one fastener holds the second mold segments in the second closed position such that the mold remains in the second closed position when the second compressive force on the second mold segments is removed, wherein the at least one fastener holds the third mold segments in the third closed position such that the mold remains in the third closed position when the third compressive force on the third mold segments is removed, and wherein the at least one fastener includes an elongate member that extends parallel to the first axis to restrain the second mold segments in the second axis and the third mold segments in the third axis.

2. An apparatus to form foam comprising:

a first pair of opposing compression surfaces, one of the first pair of opposing compression surfaces being movable in relation to a second of the first pair of opposing compression surfaces along a first axis between a first expanded position and a first compressed position;

a mold having a pair of opposing first mold segments, each of the first mold segments having a mold surface, one of the first mold segments being movable in relation to a second mold segment of the first pair of mold segments along the first axis between a first open position in which the first mold surfaces are distant from one another and a first closed position in which the first mold surfaces are proximal to one another, wherein when the first pair of compression surfaces is in the first expanded position the first pair of compression surfaces are spaced apart sufficiently to accommodate between the first pair of compression surfaces the first mold segments in the first open position, and the first pair of compression surfaces in moving from the first expanded position to the first compressed position apply a first compressive force to move the first mold segments into the first closed position, the first mold segments enclosing a mold cavity bounded by the first opposing mold surfaces; and at least one fastener that holds the first mold segments in the first closed position separately from the first pair of opposing compression surfaces such that the mold remains in the first closed position when the first compressive force on the pair of first mold segments is removed.

3. The apparatus of claim 2, wherein
at least one of the first opposing compression surfaces includes a hole to permit a gas to be injected to reduce friction between one of the compression surfaces and the mold.

4. The apparatus of claim 3, further comprising
a compressed gas supply in fluid communication with the hole in the first compression surface.

5. The apparatus of claim 2, wherein
at least one of the first mold surfaces includes a hole to permit a chemical treatment gas to penetrate into the cavity of the mold.

6. The apparatus of claim 2, further comprising:
a pressure vessel having an interior size and shape sufficient to accommodate the mold in the first closed position after the mold is removed from between the first pair of opposing compression surfaces; and
a chemical treatment gas supply in fluid communication with the interior of the pressure vessel.

7. The apparatus of claim 6, wherein the treatment gas is carbon dioxide.

8. The apparatus of claim 2, wherein the fastener includes a bolt to be inserted through a hole in one of the pair of opposing first mold segments and to be received in a threaded hole in the second of the pair of first mold segments.

9. The apparatus of claim 2, further comprising:
a piece of foam accommodated between the first pair of opposing mold surfaces, the piece of foam having an initial thickness in the first axis less than or equal to a distance between the first pair of opposing mold surfaces in the first open position, and the first mold segments in moving from the first open position to the first closed position deforming the piece of foam to have a first compressed thickness determined in the first axis by the first pair of opposing mold surfaces.

10. The apparatus of claim 2, further comprising:
a second pair of opposing compression surfaces, one of the second opposing compression surfaces being movable in relation to a second compression surface of the first pair of opposing compression surfaces along a second axis between a second expanded position and a second compressed position,
the mold further having a pair of second opposing mold segments, each of the second pair of mold segments having a mold surface, one of the second mold segments being movable in relation to a second mold segment of the second pair of opposing mold segments along the second axis between a second open position in which the second pair of mold surfaces are distant from one another and a second closed position in which the second pair of mold surfaces are proximal to one another, wherein when the second pair of compression surfaces is in the second open position the second pair of compression surfaces are spaced apart sufficiently to accommodate between the second pair compression surfaces the second pair of mold segments in the second open position, and the second pair of compression surfaces in moving from the second expanded position to the second compressed position apply a second compressive force to move the second pair of mold segments into the second closed position, the mold cavity being further bounded by the second pair of opposing mold surfaces,
wherein the at least one fastener further holds the second pair of mold segments in the second closed position such that the mold remains in the second closed position when the second compressive force on the second pair of mold segments is removed.

11. The apparatus of claim 10, further comprising:
a piece of foam accommodated between the first pair of opposing mold surfaces, the piece of foam having an initial thickness in the first axis less than or equal to a distance between the first pair of opposing mold surfaces in the first open position, and the first mold segments in moving from the first open position to the first closed position deforming the piece of foam to have a first compressed thickness determined in the first axis by the first pair of opposing mold surfaces,
the piece of foam being further accommodated between the second pair of opposing mold surfaces, the piece of foam having an initial thickness in the second axis less than or equal to a distance between the second pair of opposing mold surfaces in the second open position, and the second mold segments in moving from the second open position to the second closed position deforming the piece of foam to have a second compressed thickness determined in the second axis by the second pair of opposing mold surfaces.

12. The apparatus of claim 10, further comprising:
a third pair of opposing compression surfaces, one of the third pair of opposing compression surfaces being movable in relation to a second of the third pair of opposing compression surfaces along a third axis between a third expanded position and a third compressed position,
the mold further having a pair of third opposing mold segments, each of the third pair of mold segments having a mold surface, one of the third pair of mold segments being movable in relation to a second of the third pair of mold segments along the third axis between a third open position in which the third mold surfaces are distant from one another and a third closed position in which the third mold surfaces are proximal to one another, wherein when the third pair of compression surfaces is in the third open position the third compression surfaces are spaced apart sufficiently to accommodate between the third pair of compression surfaces the third mold segments in the third open position, and the third pair of compression surfaces in moving from the third expanded position to the third compressed position apply a third compressive force to move the third mold segments into the third closed position, the mold cavity being further bounded by the third pair of opposing mold surfaces,
wherein the at least one fastener further holds the third mold segments in the third closed position such that the mold remains in the third closed position when the third compressive force on the third mold segments is removed.

13. The apparatus of claim 11, further comprising:
a piece of foam accommodated between the first pair of opposing mold surfaces, the piece of foam having an initial thickness in the first axis less than or equal to a distance between the first pair of opposing mold surfaces in the first open position, and the first mold segments in moving from the first open position to the first closed position deforming the piece of foam to have a first compressed thickness determined in the first axis by the first pair of opposing mold surfaces,
the piece of foam being further accommodated between the second pair of opposing mold surfaces, the piece of foam having an initial thickness in the second axis less than or equal to a distance between the second pair of opposing mold surfaces in the second open position, and the second mold segments in moving from the second open position to the second closed position deforming the piece of foam to have a second compressed thickness determined in the second axis by the second pair of opposing mold surfaces, and
the piece of foam being further accommodated between the third pair of opposing mold surfaces, the piece of foam having an initial thickness in the third axis less than or equal to a distance between the third pair of opposing mold surfaces in the third open position, and the third mold segments in moving from the third open position to the third closed position deforming the piece of foam to have a third compressed thickness determined in the third axis by the third pair of opposing mold surfaces.

* * * * *